US008442920B1

(12) United States Patent
Rakowicz et al.

(10) Patent No.: US 8,442,920 B1
(45) Date of Patent: *May 14, 2013

(54) PAPERLESS MORTGAGE CLOSINGS

(76) Inventors: Paul Rakowicz, Highland, MI (US);
Robert Shanahan, Canton, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/419,539

(22) Filed: Mar. 14, 2012

Related U.S. Application Data

(63) Continuation of application No. 12/911,471, filed on Oct. 25, 2010, now Pat. No. 8,140,440.

(51) Int. Cl.
*G06Q 20/00* (2012.01)

(52) U.S. Cl.
USPC ........... 705/75; 705/7.18; 705/7.21; 705/311; 705/312; 705/313; 705/314; 705/315; 705/316; 715/234

(58) Field of Classification Search ............. 705/75, 705/7.19, 7.21, 311–316; 715/234
See application file for complete search history.

(56) References Cited

U.S. PATENT DOCUMENTS

| | | | |
|---|---|---|---|
| 4,510,619 A | 4/1985 | LeBrun et al. | |
| 5,465,299 A | 11/1995 | Matsumoto et al. | |
| 5,813,009 A | 9/1998 | Johnson et al. | |
| 6,237,096 B1 | 5/2001 | Bisbee et al. | |
| 6,594,633 B1 | 7/2003 | Broerman | |
| 7,596,511 B2 * | 9/2009 | Hall et al. | 705/313 |
| 7,707,153 B1 * | 4/2010 | Petito et al. | 707/999.101 |
| 7,769,681 B2 * | 8/2010 | Misraje et al. | 705/38 |
| 8,204,807 B2 * | 6/2012 | Triola | 705/35 |
| 2001/0018739 A1 | 8/2001 | Anderson et al. | |
| 2001/0037287 A1 | 11/2001 | Broadbent et al. | |
| 2002/0019937 A1 | 2/2002 | Edstrom et al. | |
| 2002/0040339 A1 | 4/2002 | Dhar et al. | |
| 2002/0052835 A1 * | 5/2002 | Toscano | 705/38 |
| 2002/0069179 A1 | 6/2002 | Slater et al. | |
| 2002/0143704 A1 | 10/2002 | Nassiri | |
| 2003/0229611 A1 | 12/2003 | Hintenach | |
| 2004/0049445 A1 | 3/2004 | Kishore | |
| 2004/0111619 A1 | 6/2004 | Laurie et al. | |
| 2006/0184452 A1 | 8/2006 | Barnes et al. | |
| 2007/0208661 A1 * | 9/2007 | Moran | 705/38 |
| 2009/0204521 A1 * | 8/2009 | De Sena et al. | 705/34 |

FOREIGN PATENT DOCUMENTS

GB 2378865 A 2/2003

OTHER PUBLICATIONS

Muller, "Desktop Encyclopedia of the Internet," 1999, Artech House Inc., Norwood, MA, all pages.
Gralla, "How the Internet Works," Millenium Edition, 1999, Que Corporation, Indianapolis, IN, all pages.

(Continued)

*Primary Examiner* — Calvin Cheung
(74) *Attorney, Agent, or Firm* — Adam J. Citrin, Esq.

(57) ABSTRACT

Concepts and technologies are disclosed herein for providing an electronic document processing system, an electronic document generation mechanism, an encrypted digital certificate generator, a tool for coordinating the processing of electronic documents, a packaging mechanism for finalizing and authenticating electronic documents, a tracking log for recording relevant electronic document information, and a transferring protocol for transferring the ownership of electronic documents. The present disclosure also is directed to an electronic authentication system including an electronic document authentication watermark seal or signature line for confirming a document's signing within the view. The present disclosure also is directed to a system, software program, and method for generating electronic documents, coordinating the signing of electronic documents, digitally authenticating and certifying electronic documents, and organizing electronic documents for retrieval and transfer in a mortgage closing and/or other financial services application.

20 Claims, 19 Drawing Sheets

OTHER PUBLICATIONS

White, "How Computers Work," Millenium Edition, 1999, Que Corporation, Indianapolis, IN, all pages.

Derfler, "How Networks Work," Bestseller Edition, 1996, Ziff-Davis Press, Emeryville, CA, all pages.

U.S. Official Action dated Aug. 28, 2008 in U.S. Appl. No. 11/037,505.

U.S. Official Action dated Jan. 1, 2009 in U.S. Appl. No. 11/037,505.

U.S. Official Action dated Oct. 19, 2009 in U.S. Appl. No. 11/037,505.

U.S. Notice of Allowance/Allowability dated Jun. 22, 2010 in U.S. Appl. No. 11/037,505.

U.S. Official Action dated May 12, 2011 in U.S. Appl. No. 12/911,471.

U.S. Notice of Allowance/Allowability dated Nov. 10, 2011 in U.S. Appl. No. 12/911,471.

"Understanding the closing process," bankrate.com, all pages, retrieved from "http://www.bankrate.com/finance/mortgages/understanding-the-closing-process-1.aspx," Apr. 2005, retrieved on Mar. 14, 2012.

* cited by examiner

Figure 10

AGREEMENT ALLOWING FOR THE USE OF ELECTRONIC SIGNATURES

This Agreement is between <DPS CUSTOMER NAME> hereinafter referred to as
"<SHORT CUSTOMER NAME>"and <CONSUMER>hereinafter referred to as
"You" and "Your".

THE PARTIES AGREE TO THE FOLLOWING:

Description of Transaction
This Agreement covers the electronic signing of your entire residential loan closing
package for the property located at <INSERT PROPERTY ADDRESS HERE>.

Affirmative Consent for Electronic Signatures
You consent to use an electronic signature for the transaction described above in place of
your handwritten signature for the electronic signing of your residential loan closing
documents presented to you electronically. Your consent to sign electronically covers all
electronic documents in your residential loan closing package. You agree to use your
hand written signature on the mortgage, any riders to the mortgage, and any other
documents relating to your residential loan closing documents that are presented to you in
paper form by the title company.

Copies of the electronic records signed electronically
You will receive a paper copy of all the electronic records you have electronically signed
after the electronic signing process has been completed. You agree, while you are using
an electronic signature to sign your residential loan closing package, all information
required to be provided to you in writing will be provided to you in writing.

I have read and understand the terms contained in the agreement above, and I agree to be
bound by them. I acknowledge receipt of a copy of this agreement.

_____   BY:_____
Consumer                Date           Company Authorized Agent    Date _____
                                        Title

Figure 14

PAPERLESS MORTGAGE CLOSINGS

CROSS-REFERENCE TO RELATED APPLICATIONS

This application is a continuation of U.S. patent application Ser. No. 12/911,471, filed on Oct. 25, 2010 and entitled "Paperless Mortgage Closings," now U.S. Pat. No. 8,140,440, which is incorporated by reference in its entirety. This application also claims the benefit of U.S. patent application Ser. No. 11/037,505, filed Jan. 18, 2005 and entitled "Paperless Process for Mortgage Closings and Other Applications," now U.S. Pat. No. 7,822,690, which is incorporated herein by reference in its entirety. This application also claims priority under 35 U.S.C. Section 119(e) to U.S. Prov. Pat. App. No. 60/543,148, filed Feb. 10, 2004, which is incorporated herein by reference in its entirety.

TECHNICAL FIELD

The present disclosure generally relates to the field of electronic document processing systems. More particularly, the present disclosure relates to systems and methods for generating electronic documents, signing electronic documents, and digitally authenticating and certifying electronic documents.

BACKGROUND

The mortgage closing process is traditionally very paper intensive and tedious. Borrowers must affix wet signatures to many, many documents and lenders subsequently must physically copy, distribute, register and store the signed documents.

The Mortgage Industry Standards Maintenance Organization (MISMO) has laid the foundation for paperless, electronic mortgages by defining the SMART Document specification. SMART is an acronym for Securable, Manageable, Archivable, Retrievable, and Transferable. The specification, based on XML, is a general-purpose, flexible technology that can be used to implement any paper document in electronic format. It binds together the data, page view, audit trail and signature(s) into a single electronic file. The page view may be XHTML or PDF.

Other enabling/foundational industry breakthroughs include eSignatures and the eNote Registry. The National eNote Registry is an electronic mechanism for identifying, tracking and verifying electronic promissory notes (eNotes) in a manner compliant with requirements imposed by the Uniform Electronic Transactions Act (UETA) and the federal Electronic Signatures in Global and National Commerce Act (ESIGN). UETA and ESIGN stipulate that the owner of an eNote (the Controller) has legal rights similar to those that a "Holder in Due Course" has with a paper negotiable promissory note. Moreover, ESIGN stipulates that eSignatures bear the same weight legally as wet signatures. Rounding out the eNote Registry are eCustodians or eVaults. Since the eNote Registry does not actually store the eNotes, proprietary electronic custodial repositories must exist to store and manage eNotes.

The mortgage closing process and other such financial transactions are traditionally paper intensive and tedious. Parties to the transaction must affix wet signatures to many documents, and these documents must subsequently be copied, distributed, registered, and securely stored.

The tedious nature of financial transactions opens the possibility for errors and discrepancies to occur. The necessity for each party to a transaction to sign multiple documents allows for differences in the signatures, which can give rise to dispute. For instance, a single party can sign one document 'John Smith,' another document 'John A. Smith,' another document 'J. Smith,' and yet another document 'J. S.' Because there is no way to ensure the uniformity of signatures or the terms of paper documents, the validity of these documents can be subject to question.

Furthermore, developments in digital imaging, photography, and image capture have created new opportunities for document tampering and counterfeiting. Paper documents can now be manipulated and tampered with, and such modifications are often difficult, if impossible, to detect. Signature forgery has also become widespread, further calling into question the validity of paper documents. Because such tampering is possible, an alternative to paper documents and wet signatures is preferred, to provide a more secure and efficient method of preparing, signing, and certifying documents.

The authenticity of hard documents can also be called into question when these documents have changed hands a number of times. Banks and other lending institutions frequently buy and sell mortgage agreements, and the value of these agreements can only be guaranteed inasmuch as the agreements can be shown to be authentic documents. A tracking system is therefore necessary, which securely tracks the ownership of a document from the moment it is signed.

Kishore, Nanda (United States Patent Publication No. 2004/0049445) appears to disclose a financial services automation system for automating financial transactions. However, Kishore does not impose a time limit on the signing process. Kishore does not allow for the scanning of outside documents, their conversion into digital format, and the insertion of digital signature lines. Additionally, Kishore does not allow for a second authentication and certification step at the culmination of the signing process, and the destruction of the documents if the process is not completed. Lastly, Kishore does not teach a watermark imprint or signature line that appears on all certified documents, confirming their signing.

SUMMARY

The present disclosure is directed to concepts and technologies for providing electronic mortgage closings and other transactions. According to various embodiments, the systems disclosed herein are configured to coordinate and manage a mortgage closing process, to facilitate digital signing of documents, to package the electronic documents, and to register the signed documents electronically with the Mortgage Electronic Registration System. The present disclosure is directed to processes, computer systems and software for performing the paperless closing process. The embodiments disclosed herein may work in concert with a pre-existing eVault, if desired, though this is not necessarily the case. Although the disclosed example relates specifically to lender-borrower relationships, it will be apparent to those of skill in the art that the concepts and technologies disclosed herein are applicable to other transactions and contract situations, including other types of loans for other types of purchases, settlement negotiations, and other agreements, particularly those benefiting from a sequential signature process.

According to one aspect, embodiments of the present disclosure include an electronic document processing system including electronic document generation means, means for generating digital certificates, organization means for coordinating the processing of digital documents, packaging means for finalizing and authenticating digital documents, tracking means for recording relevant document information, and transferring means for transferring the ownership of digital documents. According to other aspects, embodiments of the present disclosure include a secure system, software program, and method for generating electronic documents, coordinating the secure signing of said documents, digitally authenticating and certifying said documents, and organizing said documents for secure retrieval and transfer in the mortgage closing/financial services field.

Embodiments of the present disclosure also include a method for document processing including the steps of: generating documents, generating digital certificates, organizing and managing digital certificates, organizing and coordinating the processing of documents, packaging and authenticating documents, logging relevant document information, and transferring the ownership of documents.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 10 illustrates an exemplary view of a computer screen of a Legal Notice and Confidentiality Page, according to an exemplary embodiment.

FIG. 14 illustrates aspects of an Affidavit used to allow electronic disclosure and to allow a signer to sign an electronic record, according to an exemplary embodiment.

DESCRIPTION

Figure 1:
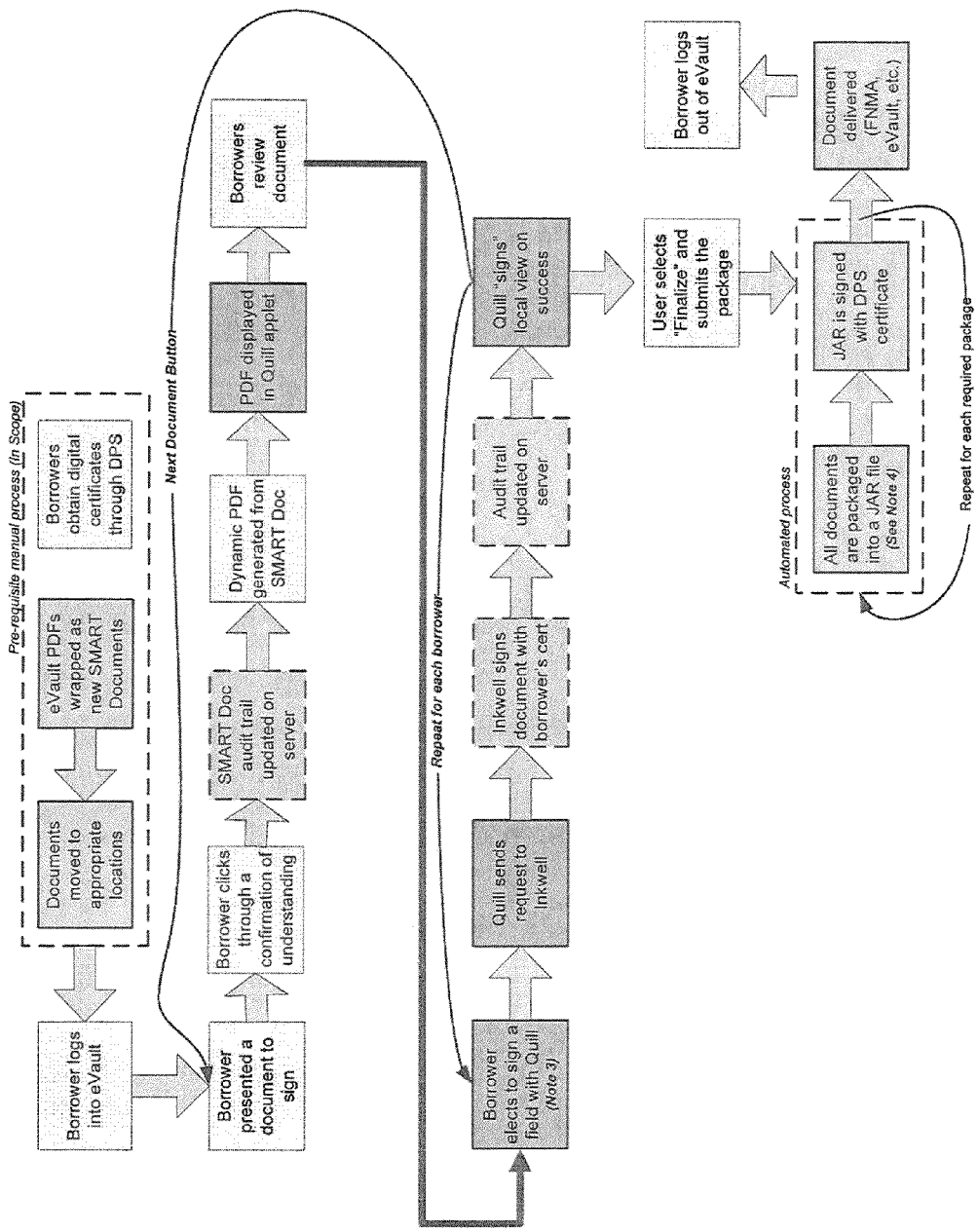
FIG. 1 is a flow diagram illustrated aspects of the electronic closing process, according to an exemplary embodiment.

In the following detailed description, references are made to the accompanying drawings that form a part hereof, and in which are shown by way of illustration specific embodiments or examples. It must be understood that the disclosed embodiments are merely exemplary of the concepts and technologies disclosed herein. The concepts and technologies disclosed herein may be embodied in various and alternative forms, and/or in various combinations of the embodiments disclosed herein. The word "exemplary," as used in the specification, is used expansively to refer to embodiments that serve as an illustration, specimen, model or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of intumescent swell devices will be presented.

FIG. 1 describes a process in which a paperless closing can be conducted via software for implementing aspects of an exemplary embodiment of the present disclosure. In the illustrated embodiment, participants in the exemplary process include borrowers, a lender/broker, and a closing agent. It should be understood that this embodiment is exemplary, and should not be construed as being limiting in any way.

Figure 4:
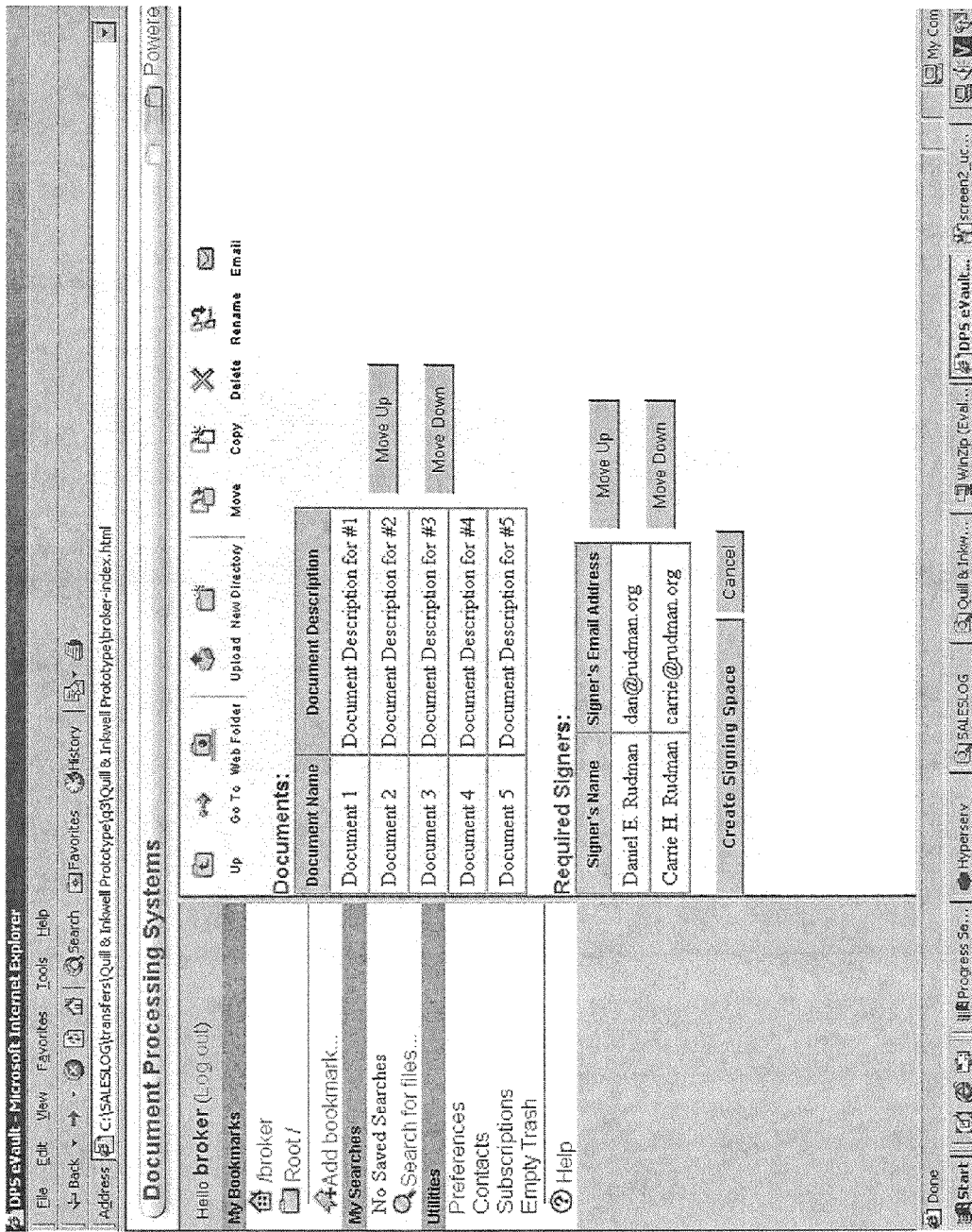
FIG. 4 is a graphical representation illustrating aspects of a 'Create Signing Space' user interface, according to an exemplary embodiment.

Prior to executing the signing process, borrower(s) obtain digital certificate(s), necessary for certifying identity, from a certificate authority, such as Verisign®. The certificates may optionally be obtained automatically on behalf of the borrower(s). The lender/broker prepares closing electronic documents (note and mortgage) and stores them on the eVault where they are converted to SMART Doc format. The lender/broker then creates a signing environment for the electronic documents, where the electronic document signing order is established and signing accounts are created for borrower(s) and closing agent. See FIG. 4. A borrower's digital certificate and encrypted private key, whether obtained by the borrower or by the document processing system disclosed herein, can be stored on the eVault with respective electronic documents.

According to various embodiments, two software components, Quill and Inkwell, collaborate to perform the electronic document signings during the signing phase of the document signing process. According to some embodiments, Quill and Inkwell function as a client and server, respectively.

According to various implementations, one or more borrowers log into the signing environment with credentials. The credentials can be established and provided by the lender/broker. If there is more than one borrower, each borrower and the closing agent may be required to log in before the electronic document signing environment is activated and/or presented. Participants associated with the closing are not required to be at the same computer and/or location.

Upon activation of the signing environment, borrowers can be presented with legal disclosures and or warning. The borrowers may be allowed to acknowledge understanding of the legally binding nature of the electronic transactions. Each borrower can be prompted to enter a pass phrase or respective key or access information, which can be used to sign each electronic document.

Figure 5:
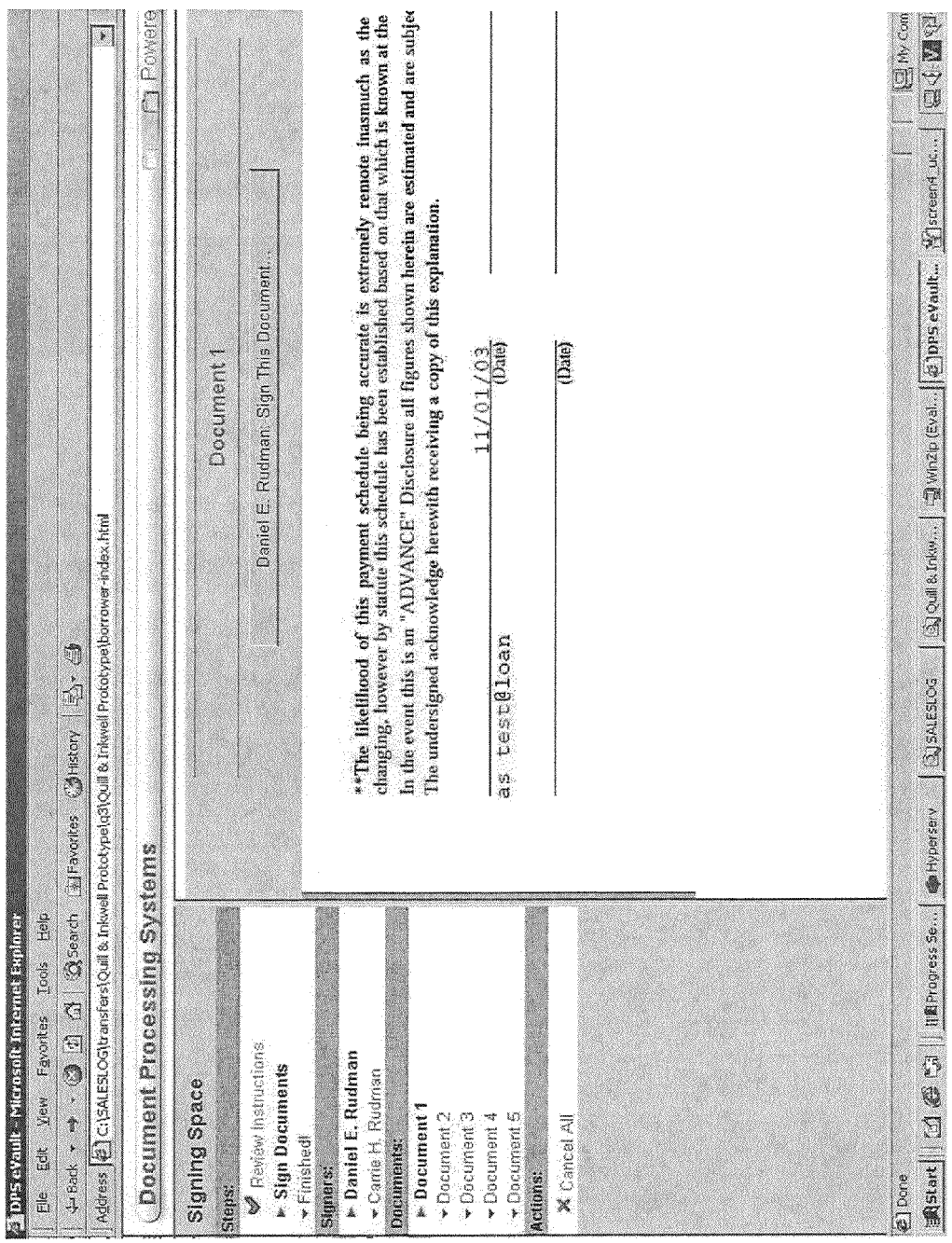
FIG. 5 is a graphical representation illustrating aspects of a 'Signing Space' user interface, according to an exemplary embodiment.

The signing environment can be configured to visually convey states throughout the process, as shown in FIG. 5. A state can include indications as to active participants, active electronic documents, signed states of each electronic document, currently available actions, and the like.

Each borrower, in turn, can be prompted to sign the active electronic document by clicking his or her respective signing button. According to some implementations, a borrower may not be allowed to sign the electronic document until all pages have been viewed. Once all pages are viewed, the electronic document hash is computed and encrypted with the borrower's private key (the signature). Inkwell applies the borrower's signature to the SMART Doc and updates the audit trail when a borrower signs an electronic document. According to some embodiments, Quill presents the next electronic document to be signed only after all borrowers have signed the active electronic document. Quill can be configured to update the view of the signed electronic documents to indicate that the electronic documents have been signed.

After the electronic documents have been signed, each borrower can confirm acceptance of the transaction, and the closing agent can acknowledge participation with an electronic signature, thus concluding the signing session. Thereafter, Inkwell packages SMART Docs into an archive file and signs the archive with the private key of a server digital certificate. According to various implementations, Inkwell registers the eNote with the eRegistry.

Figure 2:
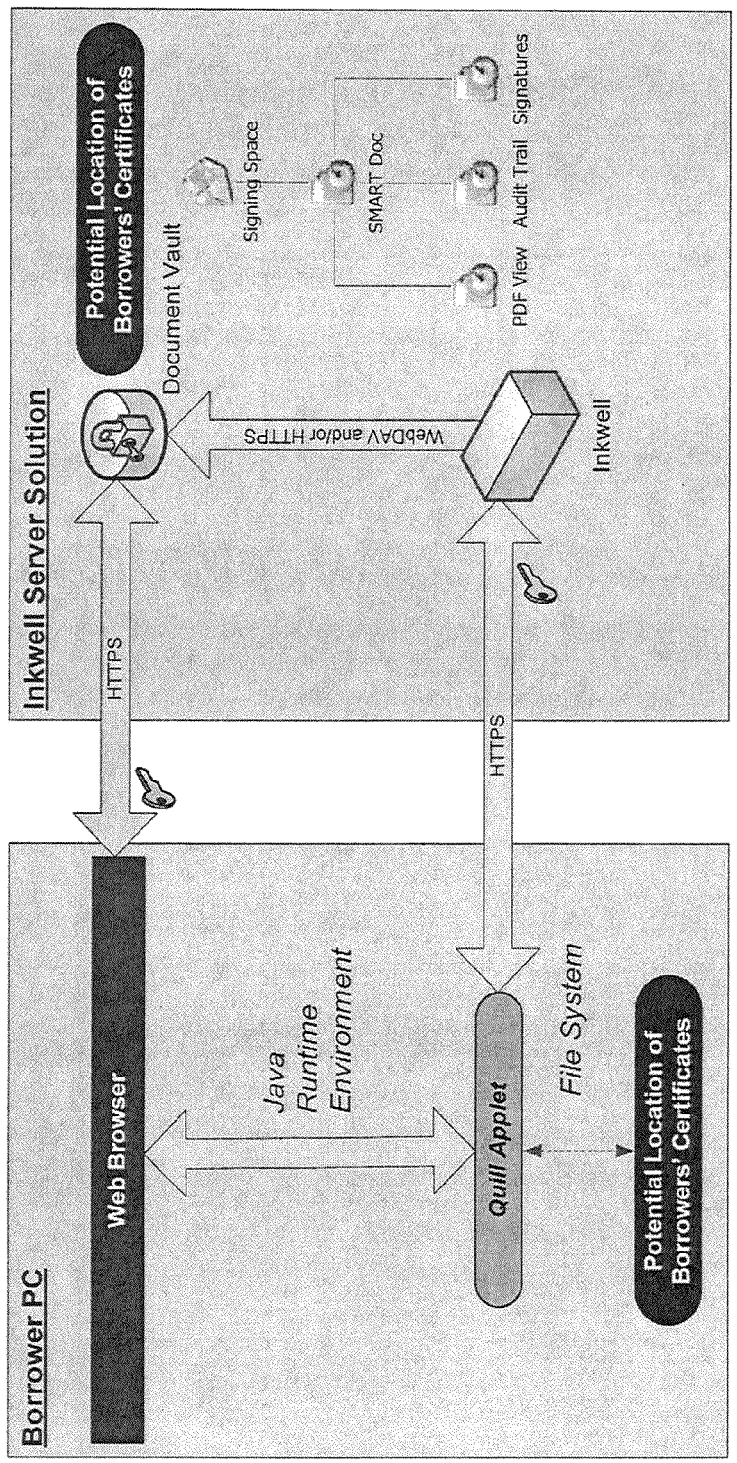
FIG. 2 is a block diagram illustrated aspects of a logical application architecture, software components, and relationships therebetween, according to an exemplary embodiment.

As illustrated in FIG. 2, a logical software architecture of the present disclosure can include a client component, Quill, and two server components, Inkwell and eVault. Implicit in the architecture are the hosting computer platforms for the components of various embodiments of the present disclosure. On the client side a computer system equipped with a web browser can be used. Examples of suitable operating systems and/or web browsers include, but are not limited to, the MICROSOFT WINDOWS family of operations systems and the MICROSOFT INTERNET EXPLORER family of web browsers from Microsoft Corporation in Redmond, Wash., Mandrake Linux 9.2 with Konqueror 3.0, the APPLE MACOS and/or LEOPARD OS families of operating systems and the SAFARI family of web browsers, form Apple, Inc. in Cupertino, Calif., web- and mobile-based operating systems and web browsers, and the like.

According to some embodiments, the web browser supports extensibility to allow various functionality associated with Quill. While FIG. 2 suggests Java applet technology for Quill implementation, other technologies, such as ActiveX technology from MICROSOFT, could be used. While ActiveX has in the past been limited to Windows and Internet Explorer, it will be appreciated that various technologies can be used with modern devices. The web browser should also support secure communications such as SSL to ensure the security and integrity of the signing session. Server platform considerations, in the context of contemporary server technology, also may take into account performance, capacity and scalability. Beyond basic server operating system features, some minimum requirements may include an off-the-shelf HTTP server that supports SSL and extensibility via CGI or other mechanisms. While FIG. 2 implies that Inkwell and eVault reside on a single server computer, this is not necessarily the case. Example server platforms include Linux with Apache 2.0 web; Microsoft Windows 2000 Server with IIS 6.0, and/or other platforms.

The client side user interface, aside from Quill, can be implemented with any web development technology. According to various embodiments, the client side user interface is implemented via HTML or XHTML output for web browser rendering. Potential implementations are plain HTML, CGI, PHP and Java Servlets.

Quill, as a separate client side component, is introduced to manage the PDF view of SMART Docs, potentially create digital signatures and optionally manage uploading of borrower digital certificates. Maintaining the SMART Doc view as PDF is preferred since a) electronic documents begin as PDF (electronic document preparation stage), b) PDF in the past has not converted easily to HTML, and c) in the past, HTML was not consistently displayed across browsers. Quill also communicates directly with Inkwell to appropriately convey the state of the SMART Doc to application users and to apply signatures to electronic documents. The preferred embodiment of Quill is Java Applet technology, which imposes few limitations on the choice of client platform and provides the most control over the presentation of the SMART Doc PDF view. Commercial and open source Java libraries for managing PDF files are widely available. Alternative embodiments for Quill include Microsoft's ActiveX technology and Adobe's Acrobat Reader Plug-in technology. The former imposes platform limitations. The latter limits control over the PDF and communication with Inkwell.

Through the browser based user interface, the lender/broker creates and manages the signing environment (see FIG. 4) and borrowers review and sign electronic documents (see FIG. 5). However, besides the PDF view, all application views can be controlled by the server component, Inkwell. As such, multiple browser instances may participate in a single signing session, hence participants need not be co-located.

Inkwell's responsibilities include: creating and deleting signing environments, managing the signing environment state, controlling the signing environment view, controlling access to the signing environment, retrieving electronic documents from eVault, managing borrower digital certificates, applying signatures to SMART Docs, maintaining SMART Doc audit trails, maintaining SMART Doc state, collaborating with Quill, packaging signed electronic documents and registering SMART Docs with the eNote Registry Inkwell's preferred embodiment is a combination of Java JSPs, servlets and POJO (plain old java objects).

The eVault component provides a secure repository for SMART Docs and digital certificates. In some embodiments, eVault conforms to open communication protocols, such as WebDAV, to facilitate and simplify interfacing with external systems and web browsers Inkwell's integration with eVault via WebDAV offers the greatest flexibility in terms of how and where eVault is implemented and deployed, although alternatives could include a) Java APIs assuming eVault is implemented with Java and runs in the same JVM as Inkwell b) Java RMI, again assuming that eVault is implemented with Java and c) web services or other implementation agnostic RPC.

In collaborating with Quill, Inkwell responds to requests for electronic documents and communicates electronic document state changes to Quill. Moreover, Inkwell responds to requests from Quill to apply signatures. If Quill and Inkwell are both implemented with Java (preferred embodiment), they communicate via RMI tunneled over HTTPS; alternatives include HTTP GET, HTTP POST and web services.

According to various implementations, Public Key Infrastructure (PKI) technology is used for creating the digital signatures. As such, a borrower's digital certificate can include a separate private key. The private key and digital certificate (CA signed public key) can be stored in the eVault along with the electronic documents. The private key is password protected. At least two alternatives exist for creating electronic document signatures. In one embodiment, Quill computes the electronic document hash and encrypts it with the borrower's private key and then sends the signature to Inkwell to apply to the SMART Doc. In this fashion, Inkwell need never have possession of the private key password and there is no question of trust. Quill, however, will require additional code libraries and will be much larger thus requiring additional time to download to the client. Alternatively, Quill can send the private key password to Inkwell and Inkwell computes the electronic document hash, encrypts with the private key and applies to the SMART Doc.

Once electronic documents are signed, Inkwell registers them with the eNote Registry. Integration with the MERS eNote Registry requires firewall-to-firewall VPN over the Internet or a dedicated frame relay circuit to MERS. The detailed requirements and specifications for registering eNotes with MERS are covered in the 'External Systems Impact Analysis' electronic document, which is available from the MERS web site: http://www.mersinc.org/download/ereg_impact.pdf.

Generally, embodiments of the present disclosure can provide a method and system for generating electronic documents that can be authenticated throughout the process, organizing and coordinating the secure review and processing of the electronic documents into packages that can be managed, organizing and coordinating the management of signers for a given signing space, organizing and coordinating the secure process for signer review of electronic documents, organizing and coordinating the secure creation and management of signing spaces, organizing and coordinating the issuing and management of digital certificates, organizing and coordinating the legally compliant signing of said electronic documents, digitally authenticating and certifying said electronic documents, automated registration and recordation of said electronic documents, means for secure delivery of said electronic documents, and organizing said electronic documents for storage and retrieval and transfer.

The present disclosure includes concepts and technologies for generating electronic documents that can be authenticated throughout the process.

The present disclosure includes concepts and technologies for organizing and coordinating the secure review and processing of the electronic documents into packages that can be managed.

The present disclosure includes concepts and technologies for organizing and coordinating the management of signers for a given signing space.

The present disclosure includes concepts and technologies for organizing and coordinating the secure process for signer review of electronic documents.

The present disclosure includes concepts and technologies for organizing and coordinating the secure creation and management of signing spaces.

The present disclosure includes concepts and technologies for organizing and coordinating the issuing and management of digital certificates.

The present disclosure includes concepts and technologies for organizing and coordinating the legally compliant signing of said electronic documents.

The present disclosure includes concepts and technologies for digitally authenticating and certifying said electronic documents.

The present disclosure includes concepts and technologies for automated registration and recordation of said electronic documents.

The present disclosure includes means for secure delivery of said electronic documents.

The present disclosure includes means for organizing said electronic documents for secure storage and retrieval and transfer.

Embodiments of the present disclosure can be utilized for numerous reasons and in numerous settings. Additionally, embodiments of the present disclosure relate to various processes that include, but are not limited to, electronic document scanning, electronic document generation, generation of secure digital certificates, coordination of electronic document signing processes, digital certification and authentication of electronic documents, packaging of electronic documents, maintenance and transfer of electronic documents, and any other process that relates to electronic document generation, coordination, and authentication. In some embodiments, systems and methods disclosed herein are well suited for use with regard to a mortgage closing process, which integrates electronic document generation, secure coordination of the signing process for the electronic documents, and the certification and authentication of the electronic documents at the culmination of the closing process. The process disclosed herein can hide the complexity of digital signature and other complex technologies rendering them invisible to the user and in so doing makes the process practical and implementable.

According to some embodiments, the systems and methods disclosed herein are useable by the mortgage industry/financial services field, as well as other fields including, but not limited to, law, health care, business, and any other fields needing the electronic document generation, coordination, and authentication systems and methods as described herein. In particular, the systems and methods disclosed herein are suited for use in fields requiring multiple identical signatures by multiple parties at multiple locations on multiple electronic documents, fields requiring secure digital authentication of electronic documents, and fields requiring the tracking and electronic documentation of an electronic document's signing parties, as well as parties to its ownership, for future reference.

The systems and technologies disclosed herein can be provided via the use of a digital interface, which can allow for presentation of digital electronic documents, organization and coordination of the signing of said electronic documents, elicitation of responses and signatures, and communication with systems at other locations. The systems and methods disclosed herein also can be customizable and thus adaptable for a variety of electronic document types, number of parties/signers and signing sequences. Moreover, the systems and methods disclosed herein can be expandable for use in settings requiring large numbers of electronic documents and signatures including, but not limited to, mortgages, complex business transactions, contracts, and any other similar electronic document signing process.

The systems and methods disclosed herein can be accessible through any device possessing the appropriate hardware capable of operating one or more systems disclosed herein. Appropriate devices include, but are not limited to personal computers (PC's), portable computers, hand-held devices, wireless devices, web-based technology systems, touch screen devices, typing devices, and any other similar electronic device capable of operating a web browser (i.e., Microsoft Internet Explorer, Netscape Navigator, Mozilla Firefox, Safari, Google Chrome, etc.) and equipped with Adobe Acrobat (pdf), or any other such electronic document reader. Alternatively, the system can operate through proprietary software. Entry of information occurs through input devices including, but not limited to, mouse/pointing devices, keyboards, electronic pens together with handwriting recognition software, mouse devices, touch-screen devices, scanners, biometric devices and any other similar electronic input devices known to those of skill in the art.

Embodiments of the present disclosure can work in unison with other networked devices, and also works independently on a single device, although operation on a single device limits functionality, especially with respect to multiple simultaneous users and communications with other systems. Thus, wired or wireless transmission from the device to a common server is possible. The data is stored on the device itself, a local server, a central server via the Internet, or a central data warehouse outside of a facility. Embodiments of the present disclosure can allow for simultaneous, multiple users.

Other functions and aspects of the electronic document processing system disclosed herein include, but are not limited to, mechanisms for scanning hard electronic documents and converting them into digital electronic documents, interfaces for presenting digital electronic documents, mechanisms for receiving user information and issuing digital certificates, storage mechanisms for storing and retrieving digital electronic documents, and organization mechanisms for coordinating the signing of digital electronic documents across multiple locations. Additionally, the document processing system disclosed herein can include a packaging mechanism that stores the certified electronic document together with the relevant signature and audit information, and secures the entire electronic document package with a tamper-evident electronic seal.

The document processing system disclosed herein can include a software program for all of the functions of the electronic document processing system, including electronic document generation and conversion, coordination of the electronic document signing process, generation of digital certificates, authentication and packaging of the electronic document, and managing of the ownership and transfer of digital electronic documents.

The software program is accessible through communication systems including, but not limited to, the Internet, Intranet, Extranet, and any other similar electronic mechanism know to those of skill in the art. Additionally, the software can be interfaced and integrated with currently existing software programs such as Microsoft Office, Microsoft Outlook, and other such business software programs, as well as existing electronic document storage systems.

In operation, the electronic document processing system involves a method including the steps of: generating the electronic documents necessary for a given transaction, organizing the electronic documents and parties to the transaction, generating secure digital certificates for said parties, coordinating the secure signing of the digital electronic documents by said parties, and digitally certifying and packaging the electronic documents.

The electronic document processing method generally includes navigating through various screens or pages containing electronic documents or relating to the organization, sequence, conversion, or processing of electronic documents. The user or administrator interacts with these screens or pages in order to input the relevant information. For example, a mortgage closing officer uses the system to select the electronic documents to be included in a specific mortgage signing, or a borrower clicks on a signature button to indicate his acceptance of the terms of the given electronic document. All parties to a given transaction log on to the system, and the system coordinates the signing process over a communications network such as the Internet, Intranet, Extranet, wireless network and other such communications networks known to those of skill in the art. By connecting multiple parties to a transaction over a communication network, the system allows a secure transaction to take place without the parties being present at one physical location. The system then saves all inputted information (electronic documents, signatures, etc.) as well as information relating to the electronic document signing process (which could include the date, time, location, and identity of the parties to the transaction) on a central server.

Once all of the steps of the signing process have been completed, the system reconfirms the acceptance of all parties to the transaction. When this confirmation is received, the system applies a digital tamper-evident seal to the electronic documents. The date, time, location, and identity of all parties to the transaction are recorded and stored together with the electronic document package. The electronic document is then forwarded to the appropriate electronic document registry for registration and indexing.

Although there are numerous embodiments of the present disclosure disclosed herein, one embodiment provides improved accuracy, efficiency, authenticity, and security of electronic document intensive transactions, electronic document signing processes, and electronic document management.

Figure 1A:
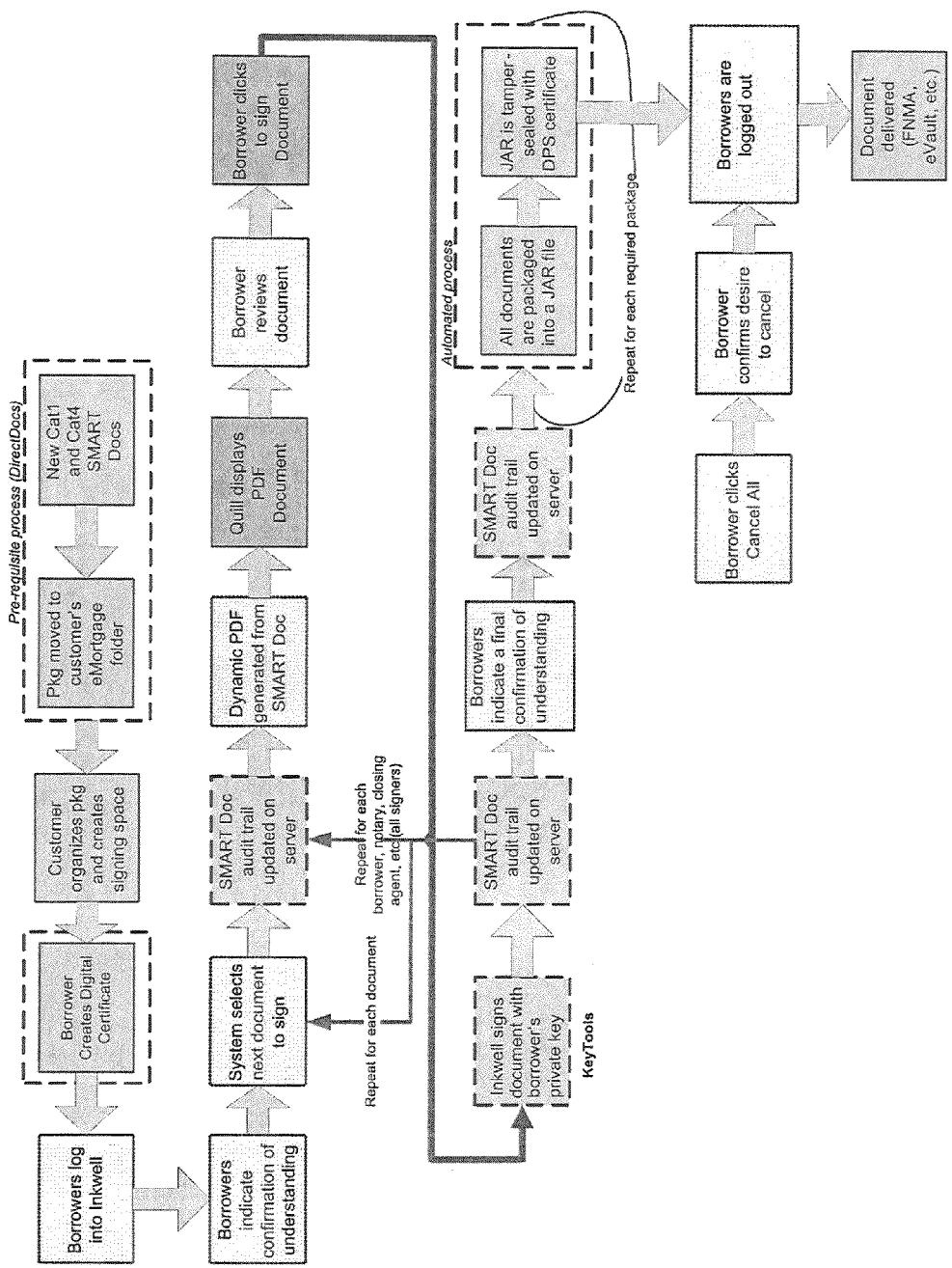
FIG. 1A is a flow diagram illustrating additional aspects of the electronic closing process, according to an exemplary embodiment.

FIG. 1A represents a process flow diagram of the preferred embodiment. The process begins with the system retrieving existing electronic documents from a data server, importing external electronic documents from another source, or generating new electronic documents by scanning and converting hard electronic documents (1). Hard electronic documents are scanned into the system with a flat-bed or form-fed scanner, digital camera, or other such image capture device, known to those of skill in the art. Electronic documents are converted to MISMO SMART Electronic document format and prepared for application of digital signatures.

The administrator of the transaction then selects and organizes the relevant electronic documents (2). The administrator of the transaction identifies the parties to the transaction, the electronic documents to be signed, the time and date of the signing, the sequence in which the parties will sign the electronic documents, and other such settings relevant to the execution of the signing, thereby creating an electronic signing space (3). At this point, the other parties to the transaction, (i.e., borrowers, sellers, notaries, closing agents, and other electronic document signers) are prompted (via email, fax, phone, or any other notification means) to log onto the system to obtain a digital certificate and private key, if not done so already, which will be used to compute digital signatures during the electronic signing process (4). Each signing party's private key is encrypted with a pass phrase known only to the signing party. The signing parties to the transaction can then log onto the system (either via a secured web page, or proprietary software installed on a PC).

The signing process begins when all parties to the transaction log onto the electronic document processing system (5), either via secured web page, or proprietary software operating on a PC. All users are connected via the Internet, or any other such communications network. If all parties to the transaction (as established by the administrator at (3)) are not logged onto the system, the signing space will not be activated. Activation of the signing space also depends on each signing party having a valid digital certificate. Once the signing space is activated, each signer is presented a confirmation page describing the legally binding nature of the electronic signing process (6). Each signing party indicates acceptance of the terms of the electronic signing process by submitting the private key pass phrase established when the signing party obtained the digital certificate. If any signing party rejects the terms, the signing will not proceed. Once all signing parties have confirmed acceptance, the system presents the first electronic document to be reviewed and signed (based on the electronic document signing settings established at (3)) (7). The system then updates the audit trail information stored on the server (8), recording that the present electronic document has now begun the signing process. The system generates a PDF view (9) based on the electronic document stored on the server. This electronic document view is then presented to all parties of the transaction for review (10). The parties to the transaction review the electronic document (11), and then click a signing button (12) in the signing sequence established at (3), indicating their acceptance of the terms described by the electronic document. When each party to the transaction clicks his respective signing button, the information is communicated to the server, which applies a digital signature to the present electronic document using the private key associated with the current signer's digital certificate (13). This signature is stored in the MISMO SMART electronic document as a W3C XML digital signature and reflected in the electronic document in the form of either a watermark (e.g. categories 3 & 4 MIMSO SMART electronic document) or a signature line (e.g. categories 1 & 2 MISMO SMART electronic document). The audit trail is then updated on the server (14), recording information such as the time, date, and location of the signing, as well as the identity of the party. Each party to the transaction proceeds through this signing process (beginning at (8)) for each electronic document to be signed. When all parties to the transaction have completed the signing of one electronic document, the system selects the next electronic document to be signed (7), based on the electronic document signing sequence established at (3). The system operates in this fashion until all electronic documents in the signing sequence have been signed by all parties. Alternatively, the system can be configured to allow for a "one-click" signing process, whereby the parties to a given transaction can digitally sign a series of electronic documents with one digital signature click.

The system does not operate unless all parties have signed all relevant electronic documents in sequence. Thus, a given party cannot proceed to sign the next electronic document until all parties have signed the current electronic document. If one or more parties to an electronic document do not sign an electronic document within the given time (as established at (3)), the entire signing process (or, alternatively, the signing of that specific electronic document) is cancelled and the electronic documents destroyed.

After all parties to the transaction have signed all of the electronic documents in the signing process, the system prompts each signer to confirm again his/her understanding and acceptance of all the terms of the transaction (15). Each signer indicates final confirmation by submitting the private key pass phrase established when the digital certificate was issued. (15). The process will not complete unless all signing parties accept final confirmation.

After final confirmation by all signing parties, the transaction is then automatically registered with the appropriate local, state, federal, or other registry (20) via an electronic registration, email, fax, or other such correspondence, thereby completing the process. Moreover, authoritative electronic document copies are registered and maintained by the system until such time that they are transferred to another party.

At any point during the process, any party to the transaction may elect to cancel the entire transaction. The party clicks on a cancel button (21), indicating the party's desire to cancel the transaction. The party is then presented with a request for confirmation (22), in which the party can elect to confirm the cancellation, or to return to the transaction. If the user confirms the cancellation, the entire signing process is terminated, and all electronic documents in the process (signed and unsigned) are destroyed. If the user elects to return to the transaction, the user is returned to the most recently viewed electronic document screen.

Figure 2A:
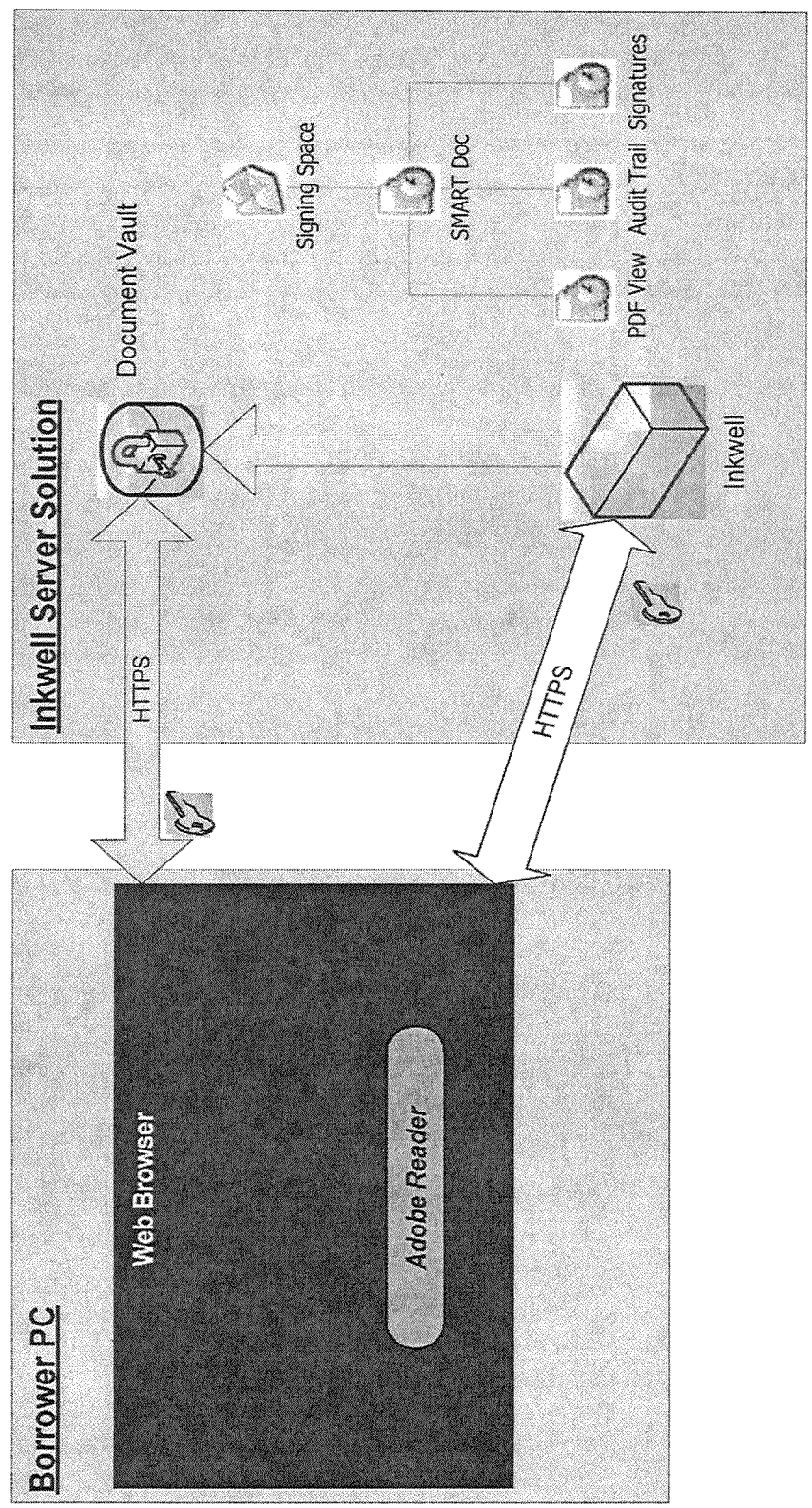
FIG. 2A is a block diagram illustrating aspects of a logical application architecture, software components, and relationships therebetween, according to an exemplary embodiment.

A logical architecture of one embodiment of the present disclosure is set forth in FIG. 2A. The parties to the transaction interact with the system via remote PC's, which connect to a server via the Internet, Intranet, or other such communications network. Each remote PC interacts with the server via a web browser (i.e., Microsoft Internet Explorer, Netscape Navigator, etc.) and a digital electronic document viewer (i.e., Adobe Acrobat Reader, etc.) for viewing and interacting with electronic documents. Alternatively, the system could display the electronic documents using XML, HTML, or any other such electronic document format, thereby eliminating the need for Adobe Acrobat Reader. Additionally, the system can also operate over a proprietary software program, thereby eliminating the need for a web browser altogether.

The remote PC's interact with the server via secure network connections. Example server platforms include Linux with Apache 2.0 web, Microsoft Windows 2000 Server with IIS 6.0, or other such server platforms known to those of skill in the art. The server contains the electronic document signing space, which includes the electronic document package, as well as the settings established for the electronic document signing. The electronic document package contains the dynamic (PDF) view of the electronic documents, the audit trail (containing the relevant electronic document history) and the digital signature certificates.

Figure 3:
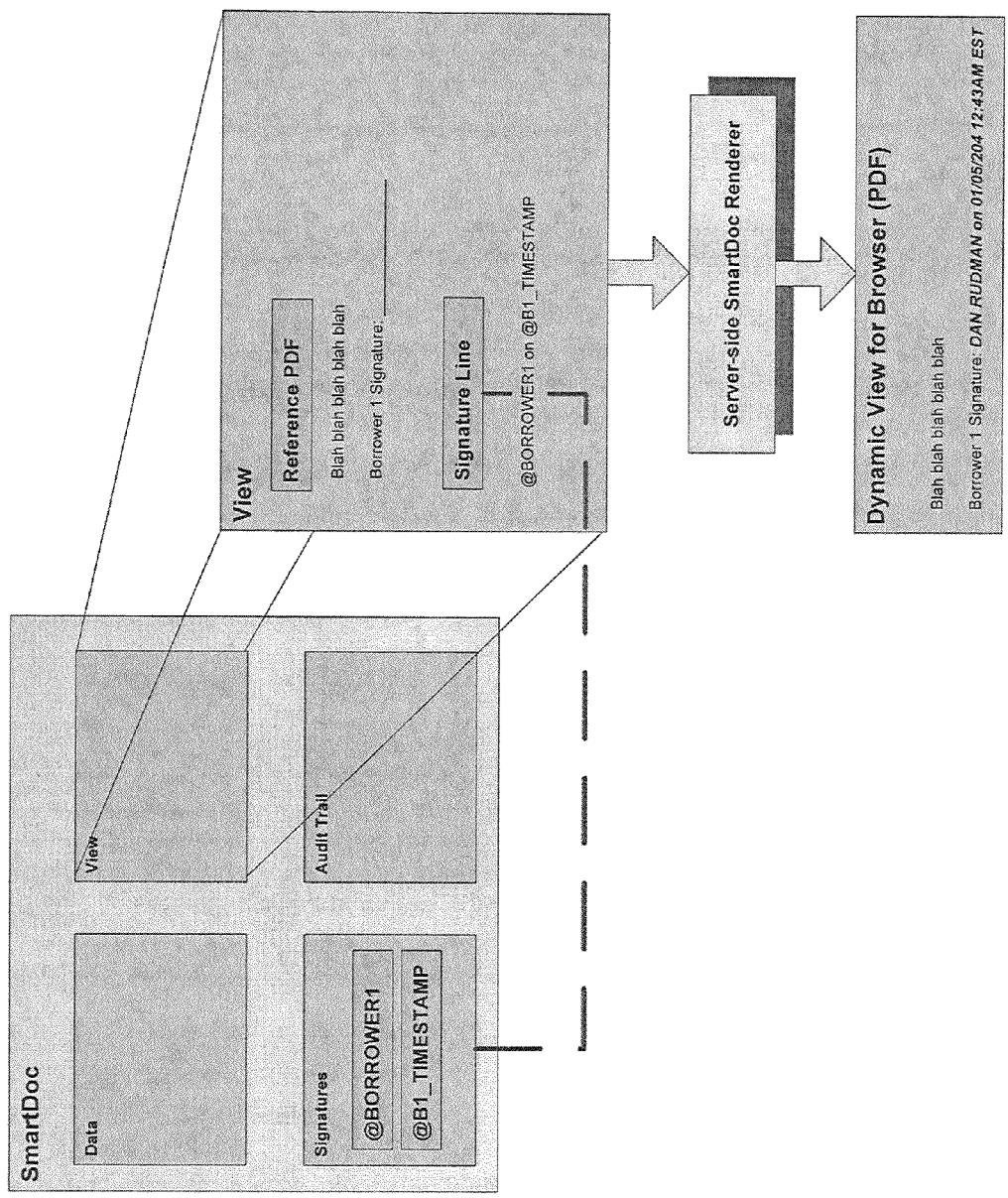
FIG. 3 is a block diagram illustrating aspects of document view rendering, according to an exemplary embodiment.

FIG. 3 represents the logical composition of an electronic document. The electronic document includes the relevant electronic document and transaction data associated with the electronic document, the digital signature certificates associated with the electronic document, the audit trail containing the recorded history of the electronic document, and the electronic document view. The electronic document view contains the reference PDF file, representing the template of the electronic document, populated with the appropriate information relevant to the present transaction. The electronic document view also contains a signature line that conveys the relevant digital signature certificates associated with the electronic document. When viewed through an electronic document viewer (i.e., Adobe Acrobat), the electronic document is rendered as a visual representation of the present electronic document, complete with a visual representation of the relevant parties' signatures, and the time and date of the signing.

Figure 4A:
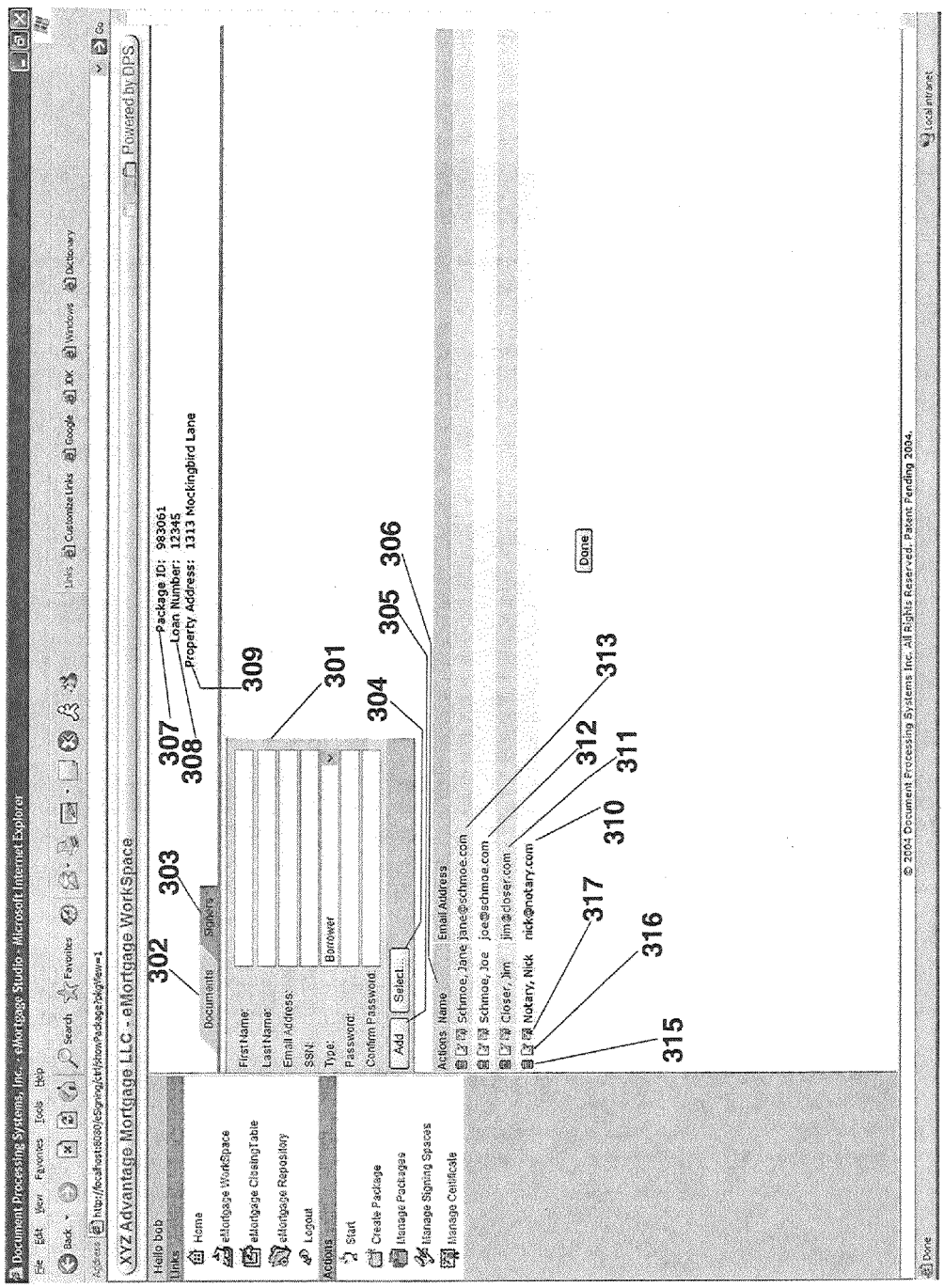
FIG. 4A illustrates an exemplary view of a computer screen associated with a Signer Manager, according to an exemplary embodiment.
Figure 4B:
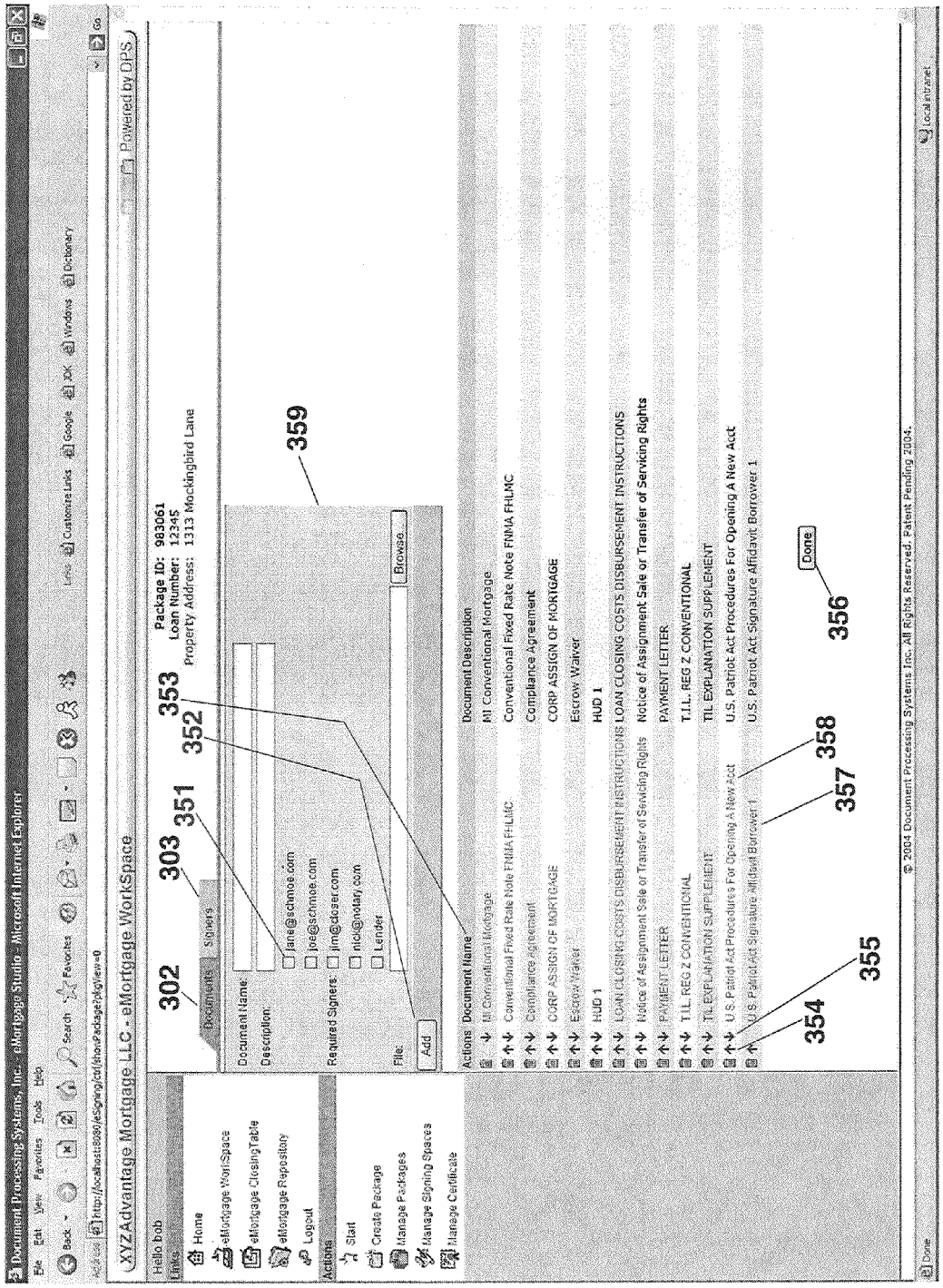
FIG. 4B illustrates an exemplary view of a computer screen of a Document Manager, according to an exemplary embodiment.

FIG. 4B represents the customization tool for managing the electronic document signing process. The administrator of the transaction (typically a mortgage closing agent) utilizes this tool to manage the parties to a given transaction, the electronic documents to a given transaction, and the specific settings relating to a given transaction. The administrator can add, delete, and modify parties to a transaction, select which electronic documents are to be signed during a given signing process, and modify the sequencing of the electronic documents to be signed and the parties to sign them.

Figure 5A:
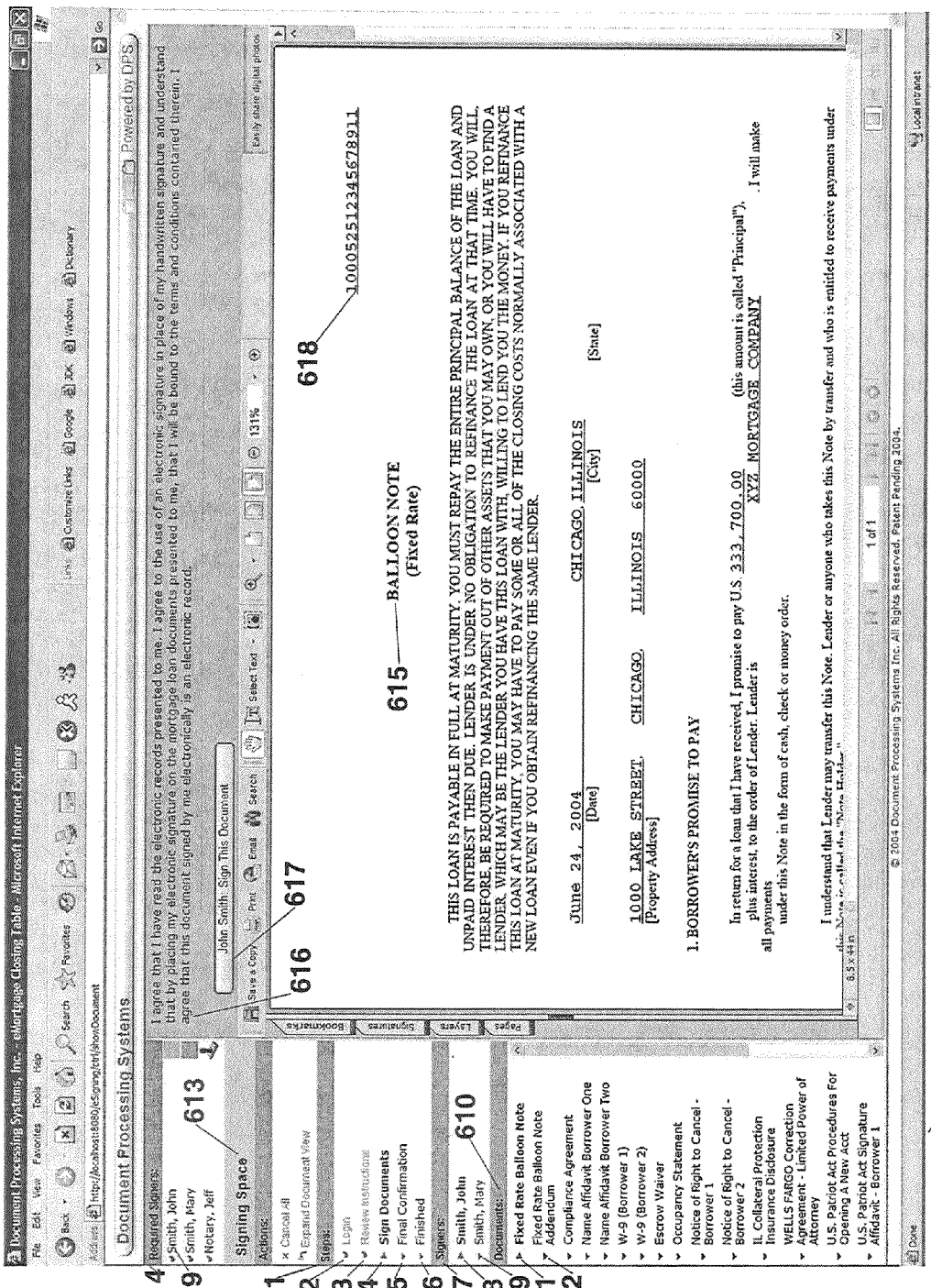
FIG. 5A illustrates an exemplary view of a computer screen of a Document Signing, according to an exemplary embodiment.

The actual electronic document signing space is depicted in FIG. 5A. All parties to a transaction interact with this screen during the signing process. The signing space contains the dynamic view of the electronic document to be signed, as well as a menu bar containing information relevant to the electronic document signing process. The menu bar contains a list of the required signers to the electronic document, and indicates the status of each signer (i.e., has not signed, awaiting signature, already signed, etc.). The menu bar further reflects the steps of the signing process (i.e., login, read instructions, sign electronic documents, etc.), and indicates the current state of the signing process, as well as which electronic documents have been signed, and which remain to be signed. Also included in the menu bar is an action menu, which includes the relevant executable actions on the present electronic document, such as expand electronic document view, and cancel all electronic documents. The signing space further includes a signing button that conveys the state of the given parties signing of the given electronic document (i.e., has not signed, awaiting signature, already signed, etc.), and prompts the user to click the signing button, if applicable.

Automated Fool-Proof Process for Signing Electronic Documents

The systems and method disclosed herein allow coordination and management of a mortgage closing process, facilitation of digital signing of electronic documents, packages the electronic documents and automatic registration of the signed electronic documents electronically with the Mortgage Electronic Registration System. The concepts and technologies disclosed herein include processes, computer systems and software for performing the paperless closing process. The systems and methods disclosed herein may work in concert with a pre-existing eVault or other registration systems and governmental agencies for electronic recordation. Although the disclosed example relates specifically to residential mortgage loan relationships, it will be apparent to those of skill in the art that the concepts and technologies disclosed herein are applicable to other transactions and contract situations, including other types of loans for other types of purchases, settlement negotiations, and other agreements, particularly those benefiting from a sequential signature process.

In one embodiment of the present disclosure, automation is used to allow the Software Application to control the majority of the process and preferably control the entire process. With this embodiment of the process, the system or a person sets up or configures the entire process in advance to make the process idiot-proof. For example, prior to a closing session, all electronic documents are pre-loaded in the software. The order of electronic documents is predetermined in the configuration before any party goes to a closing table. Once the process is configured in advance, the entire process is automated, to minimize errors, to prevent omitted electronic documents, to generate ONLY A COMPLETE ELECTRONIC DOCUMENT SET. Quality control can be assured by using the process of this embodiment. Quality control assures that 1) Electronic documents are signed in specified order; 2) Each electronic document is signed by all appropriate parties with appropriate signature; 3) All electronic documents are signed; 4) A notary observes the entire closing; and 5) Backdating and other such nonsense is prevented. Additionally, all electronic documents to be signed are included in a list on the screen. As the process progresses, the location of the electronic document presently in process of being signed is highlighted or otherwise displayed different from the other electronic documents in the list on the screen so that it is always known with what electronic document in the process you are at. All electronic documents that have been signed can be viewed throughout the continuation of the signing process.

Electronic documents are presented during the process in the order specified by the system or person that configures the process. This embodiment is geared so that it is much less likely in a normal operating environment to make errors or to generate an electronic document set that is missing an electronic document. Although it is possible that the configuration person could make a mistake, which could happen on very rare occasions, it is less likely with this process and method. For example, the configuration person, who would generally do this process often, would use the same or similar list of electronic document types for each type of electronic document set. There may be several combinations of electronic documents used together. The configuration preparer can take advantage of these sets of combinations. This can also be automated so electronic document combinations can be verified through computer comparisons to help eliminate error possibilities.

With this embodiment of the process, it is preferably set up so that no step may be left out and if any party misses a step, takes too long or otherwise does not complete the process, the process terminates and may delete any and all electronic documents that were electronically signed in the session. Although the process may have variations and parts of it may be omitted in other types of applications and uses, the following list of steps may be included in the residential mortgage industry;

Steps of the Process

1. Generating Appropriate Data to Make an Electronic Document Package and a Workspace The Broker/Lender can order an electronic document set. This electronic document set then may be uploaded to an electronic workspace wherein additional processing would occur in a secure yet collaborative environment. These electronic documents that are uploaded would automatically identify the appropriate signers for each electronic document.

2. Finalizing the Electronic Document Package with Additional Processing

The electronic documents, having been originally uploaded to a secure, collaborative workspace, are then made available to appropriate parties for inspection and verification. These parties would include, for example, the Lender, the Broker, the Title Company, and the closing agent. Each of these parties would review the electronic documents placed into the workspace and add any additional electronic documents needed for the closing. This can be done manually through a user interface or automatically through an interface. These electronic documents can be Title Company electronic documents like the Title Insurance and/or Lender electronic documents like the original 1003 (URLA—Universal Residential Loan Application). There may also be electronic documents that were placed in the workspace during the original electronic document selection that would be removed, for instance an electronic document like the closing instructions might have been included so that the closing agent has appropriate instructions for performing the closing, but it is an electronic document that the borrower is not meant to sign. Thus closing agents might copy or print electronic documents for their own use, then delete from the workspace so it would not be included in the closing. There may be some back and forth electronic document changes and discussions between the Lender and the Broker and the Title Company and the Closing Agent. The upload process during this stage of adding electronic documents would include a step to either automatically or manually identify the appropriate signers for each electronic document being added.

3. Appropriate Parties Certifying that Electronic Documents are Correct and Thereby Create a Signing Space Once the Lender and/or Broker and/or Title Company and/or Closing Agent and/or Notary are in agreement that the all electronic documents are present, complete, in correct form, have correct parameters, are error-free, in the correct order and ready for processing, then one or more of them sign off on it which will then create an appropriate Signing Space. This approval process can be done in a number of ways. For example: one or more parties digitally sign screen-text that specifies their approval of the package to proceed to closing, with this sign-off stored within the Repository. Alternatively, each page of each electronic document can have a marking as a header, footer or anywhere in between indicating that all parties at the signing approve of wording. This marking can be a logo of each, or an alphanumeric phrase or combination of each. A small watermark may be used. With this mark on each electronic document, the borrowers are assured that the electronic documents that they are viewing are approved electronic documents. The agreed upon electronic documents may be stored in a vault with electronic signatures or accompanied with an Affidavit stating that the electronic documents are to be used in an electronic document signing session and that both Lender and Closing Agent agree. Alternately, the computer can make two of each electronic document, one with the Lender's and Closing Agent's electronic signatures and/or watermarks and a duplicate may be automatically generated in the process that is to be used by the signers. Any combination of the above may be used and other ways of performing this step of the process may be used so long as it is clear that the agreed upon appropriate party/parties confirms that the appropriate electronic documents are included.

4. Signers Preparing for Signing Space by Having the Identification and Authentication of Signers Prepared by the Registration Authority and Signers Get Issued Digital Certificates if they do not Already have One During the process of Electronic document Selection and Processing, all appropriate signers to the Electronic documents were confirmed to exist in the Workspace, or were added so that they existed within the Workspace. Generally, the Notary and Closing Agent involved in any closing will make certain they have a digital certificate for signing purposes prior to the Signing Space being completed. In order for them to create digital certificates, they will go through the Identification and Authentication process handled by an approved Registration Authority, usually the Registrations Authority for a Notary or Closing Agent will be a Title Company or Lender.

For other signers, for example the borrower or seller, digital certificates will be created at the time of the actual closing. This can be done either over the phone, online, or face-to-face depending of the level of certificate needed for the electronic documents to be signed. In a residential mortgage loan closing, a face-to-face meeting will occur wherein the Registration Authority will confirm the Identity of the signer, Authenticate the signer, and then cause the signer to obtain for themselves a digital certificate.

In one embodiment, the concepts and technologies disclosed herein facilitate the process of issuing digital certificates, which traditionally requires a subject/applicant to seek out a certificate authority (CA) and purchase a digital certificate of the appropriate type. In the preferred embodiment, each signer is issued a digital certificate, at no cost to the signer, by a self contained CA server and public key infrastructure. Following signer authentication, each signer logs into a certificate creation station using credentials supplied by the lender/closing agent/notary. The signer is presented the certificate subject distinguished name, which is defined using information about the signer. Notaries must include commission or "seal" information including commission expiration and county of issuance. The signer verifies the subject distinguished name and then supplies a confidential pass phrase (known only to the signer); the pass phrase is used to encrypt the certificate private key. The encrypted private key and the certificate are stored in the application's database. According to various embodiments, the certificates issued by the self-contained CA server are not usable in a context outside of the various embodiments disclosed herein.

The validity periods of signer certificates may be configured according to signer type. For example, borrower and seller certificates can be configured to be valid for 30 days or even 24 hours. It is desirable, however to configure notary and closing agent certificates to be valid for a period of 6 months or more since notaries and closing agents participate in the signing process on a regular basis

5. All Signing Parties Authenticating Themselves into the Software and Use their Pass-Phrase or Other Means of Authentication to Sign Off on Consent then all Signing Parties Proceed to Sign Electronic Documents Using the Pre-Configured Features Built into the Software The closing table(s) is/are prepared in the following way. There can be more than one closing table as this process can be performed simultaneously in many locations, cities, states, countries, from sea above or below water, from a vehicle, from an airplane, spaceship, (from another planet, from an asteroid, or a moon). This process can simply be performed from any location that can physically connect to the other computers through the internet, phone, radio, cable, wire, fiber optics, cell phone or other means of communication. In the best form of this embodiment, a notary public would be present at each closing table. Often, the Closing Agent may be a notary public. In preparation for closing, a lender/broker will require that the signers sign an Affidavit or Declaration in wet ink stating that they consent to use electronic records and electronic signatures in place of paper electronic documents. Some of the legal forms, such as the Affidavit help bind this process together and are shown in tables and Figures as examples.

All signers are present at the closing table, with the exception of possibly the lender, and preferably with a notary present at each closing table. Although the process could be completed without the notary at the closing table, having a notary at each closing table provides the greatest assurance that the process is done properly. One notary may be present at multiple locations by using a video phone or other device. At the closing table, the process is automated using the setup configuration certified in step 3. As stated, oftentimes it is efficient and cost effective to use the same person for the Closing Agent and Notary.

At the closing table, the application is initialized with the signing space that corresponds with the electronic document package to be signed. However, the signing space will not be activated until all required signers login to the signing space. Immediately following login, signers, including borrowers, sellers, notaries and closing agents, are presented with a legal notice describing the signing process and its legally binding nature. Each signer indicates assent to the legal notice by entering the digital certificate private key pass phrase established when the certificate was issued (per step 4). The pass phrase is used to decrypt the signer's private key, which is used to digitally sign electronic documents. The process will not continue until all signers successfully indicate assent.

Figure 10:
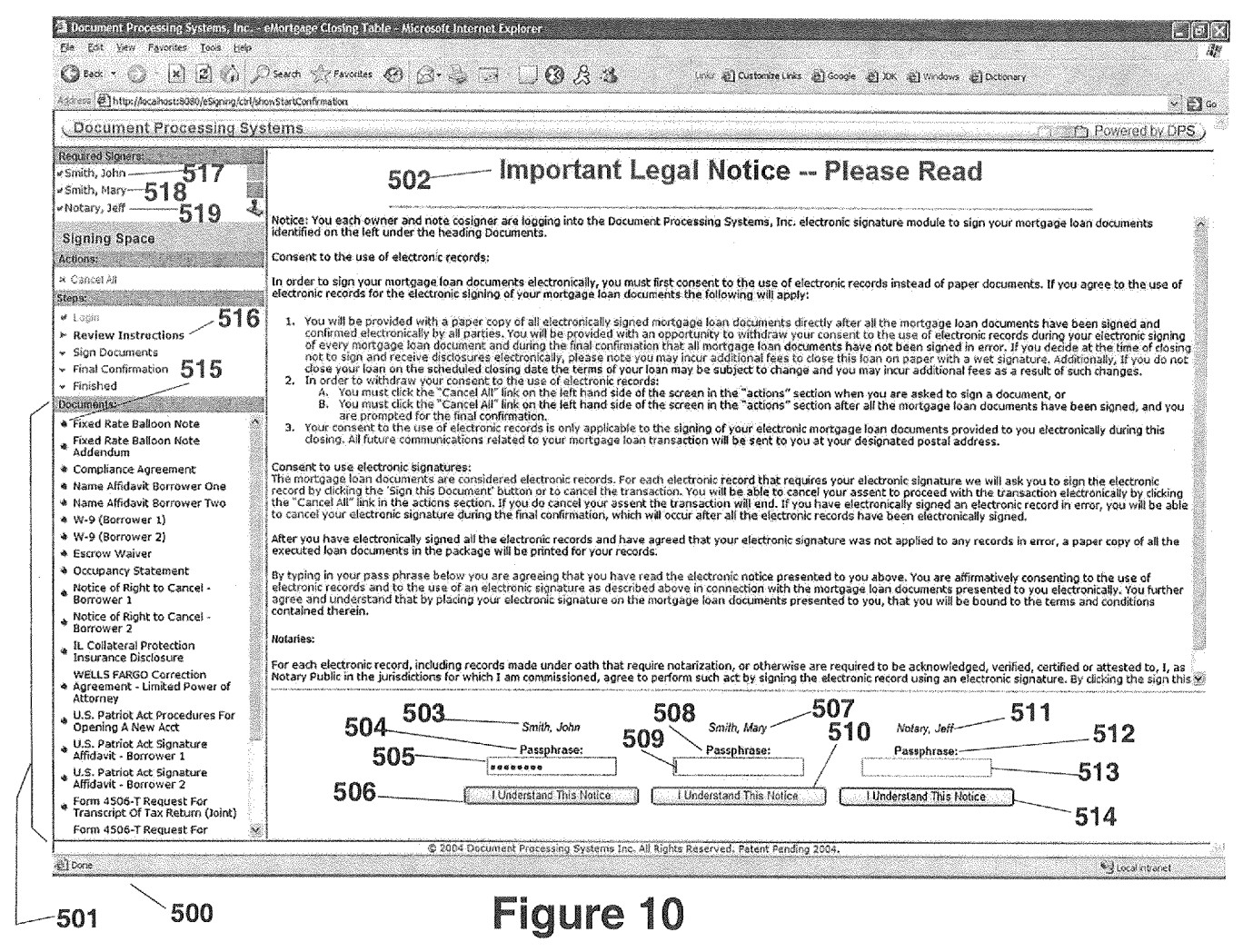

Continuing the process, the software application, already configured, chooses electronic documents to display in the order that was already specified in advance. For every signature, there is a place where the user clicks. The signature may be done in alternative ways that do not deviate from the concepts and technologies disclosed herein. Just to name some examples, one may use a pointing device such as a mouse, electronic pen, other pointing device, the enter key, any key on the keyboard (for example the key of the first or last name of a signer, or each signer can be assigned a different key of a keyboard, a palm-print reader, a thumb-print reader, a foot-pedal, a voice-recognition sound generated by the voice-print of each signer, an eye-scan, a wireless generated signal, any variation of these ideas, or any device not mentioned in existence or ones that are not yet in existence at the time of this writing. There could be a special device made for such a signing involving switches, mice, push-buttons. It could even be that each signer is given their own mouse or other device to avoid error or any possibility that signers can get mixed up. In this case, it could even be made where only the mouse of the person whose turn it is to sign is active at any given time. One can use a Fingerprint Reader such as that sold by Microsoft used for logging on without requiring passwords or pass phrases, however, instead of using the fingerprint to log on, to use the fingerprint to indicate an electronic signature, or to replace a pass phrase. Another way that is a new innovation of the concepts and technologies disclosed herein is that a different color is shown on the screen for each signer with or without their name on the screen as seen as reference numerals 506, 510 and 514 in FIG. 10. It is difficult to show as color Figures may not be used in patents, so it can be stated that each occurrence when it is time for a signer to sign, the screen may have a big box or other shape on the screen to be clicked by the appropriate signer, and it is this box or shape that can preferably have a different color for each signer as well as spelling out the signer's name in each box to be clicked. In fact, not only will each box be a different color for each signer, but each user will have a unique signature button box color to click throughout the session. In this example, the notary may always use the color white.

Lenders typically are not present at the closing table, but are required to sign various electronic documents. Part of the package configuration may include issuance of a digital certificate to a lender representative. Where necessary, a digital signature can be applied on behalf of the lender representative, by the concepts and technologies disclosed herein, to appropriate electronic documents after all other signatures are applied.

Although the signers may be given advance copies of each electronic document, the process should be such that any signer can view any signed electronic document at any time during the process.

If any signers leave the process, then the process ends and must be started over another time. Alternately, it could be made to have a continuation, for example after lunch break or other break. The process could be frozen to be re-activated later, for example, where each signer uses his or her pass-phrase or other code used to reactivate after lunch or break. Some electronic document signing sessions may have a very large number of electronic documents and may take a full day or more than one day. Such sessions reinitialize only after all parties successfully enter their pass-phrases when prompted.

After all signers have signed all of the electronic documents in the electronic document package, the system prompts each signer to confirm again his/her understanding and acceptance of all the terms of the transaction. Each signer indicates final confirmation by again submitting the private key pass phrase established when the digital certificate was issued. The process will not complete unless all signing parties accept final confirmation

6. Distributing Signed Electronic Documents

Following final confirmation, the transaction is then automatically registered with the appropriate local, state, federal, or other registry via an electronic registration, email, fax, or other such correspondence, thereby completing the process. Moreover, authoritative electronic document copies are registered and maintained by the system until such time that they are transferred to another party.

The preferred embodiment already has been described as a process with various steps. To clarify the process, FIGS. 4 through 13 illustrate the steps of the process.

Examples of Screens of the Preferred Embodiment

There are various screens that can be used in the preferred embodiment shown in FIGS. 4 through 13. These screens of this embodiment may have variations and are not limited to what is shown in the screens as variations may be used in the concepts and technologies disclosed herein. The purpose of the screens is to show how the software functions. It is the intention of the concepts and technologies disclosed herein that the end-users will know where they are in the software at any time to make the software user-friendly and every attempt has been made to accomplish this as seen in the screens. It would have been nice if larger representations of the screens could be shown in the patent application to make the print larger and more read-able, however, due to the size requirements of the U.S. Patent Office, the screens and the print are about as large as is permitted.

Electronic Document Repository Manager

Figure 6:
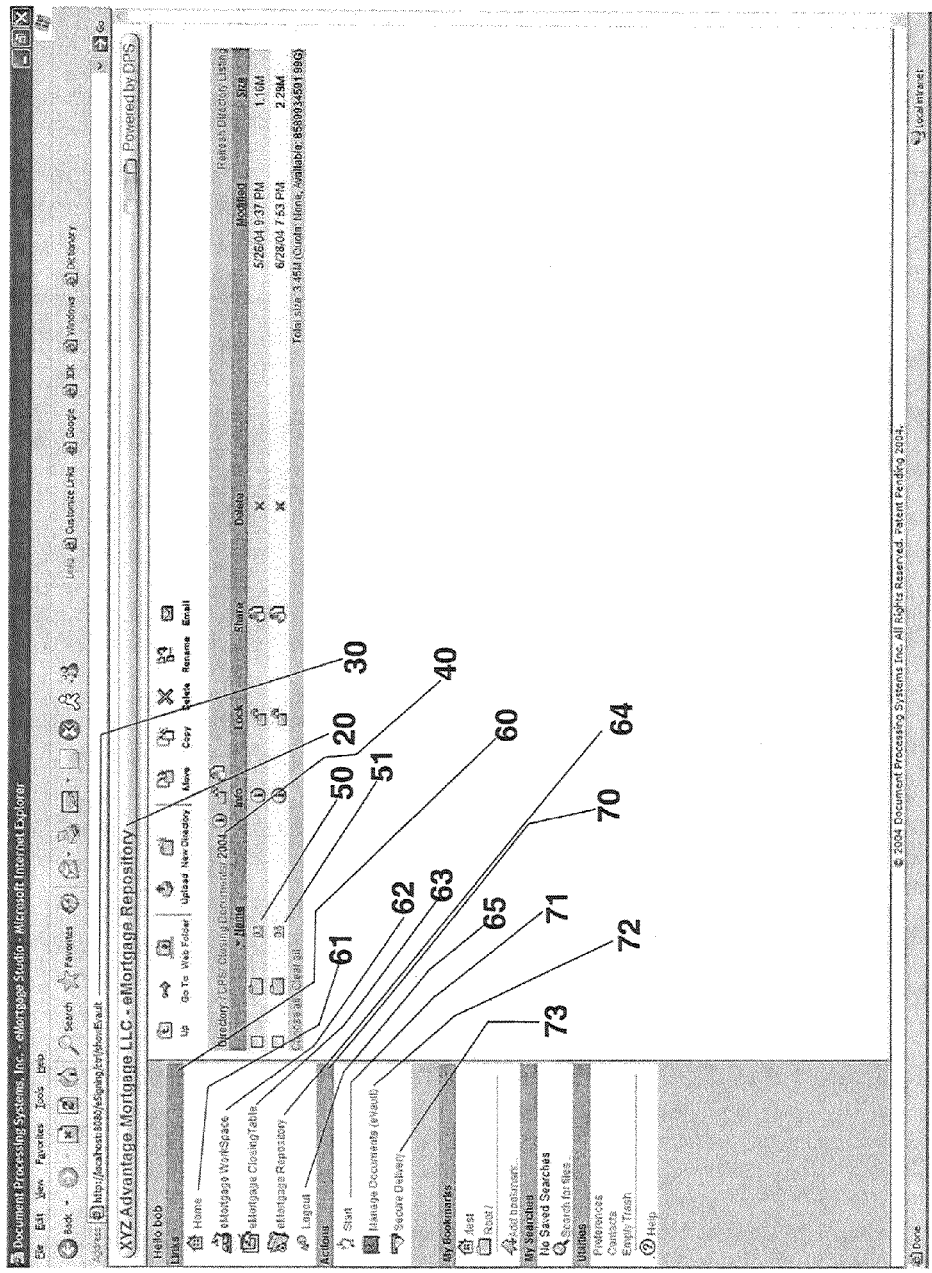
FIG. 6 illustrates a computer screen of a Document Repository Manager, according to an exemplary embodiment.

FIG. 6 shows a computer screen of the Electronic document Repository Manager indicated by reference numeral 10. Reference numeral 20 refers to the title of the XYZ Advantage Mortgage LLC eMortgage repository where electronic documents are electronically stored as displayed on the screen. This may be done, for example, in a place where data is stored. However, for extra security so that the data will survive catastrophe and acts of G-d, data may be stored in a location inside a mountain in a remote area. Such data storage may cost more money; however, it is worth the extra cost as these are important electronic documents. Reference numeral 30 shows how the web address where the data is stored is displayed on the screen. Reference numeral 40 indicates what file directory is being represented on the screen. Reference numerals 50 and 51 show two of the available directories, in this example named "03" and "06." Reference numeral 60 is darkened and says "links," and the links are listed below, for example reference numeral 61 is home, reference numeral 62 is "eMortgage WorkSpace," reference numeral 63 is "eMortgage Closing Table," reference numeral 64 is "eMortgage Repository" and reference numeral 65 is "Logout." Reference numeral 70 is the darkened area "Actions" which include reference numeral 71 is "Start," reference numeral 72 is "Manage Electronic documents (eVault)" and reference numeral 73 is "Secure Delivery."

Figure 7:
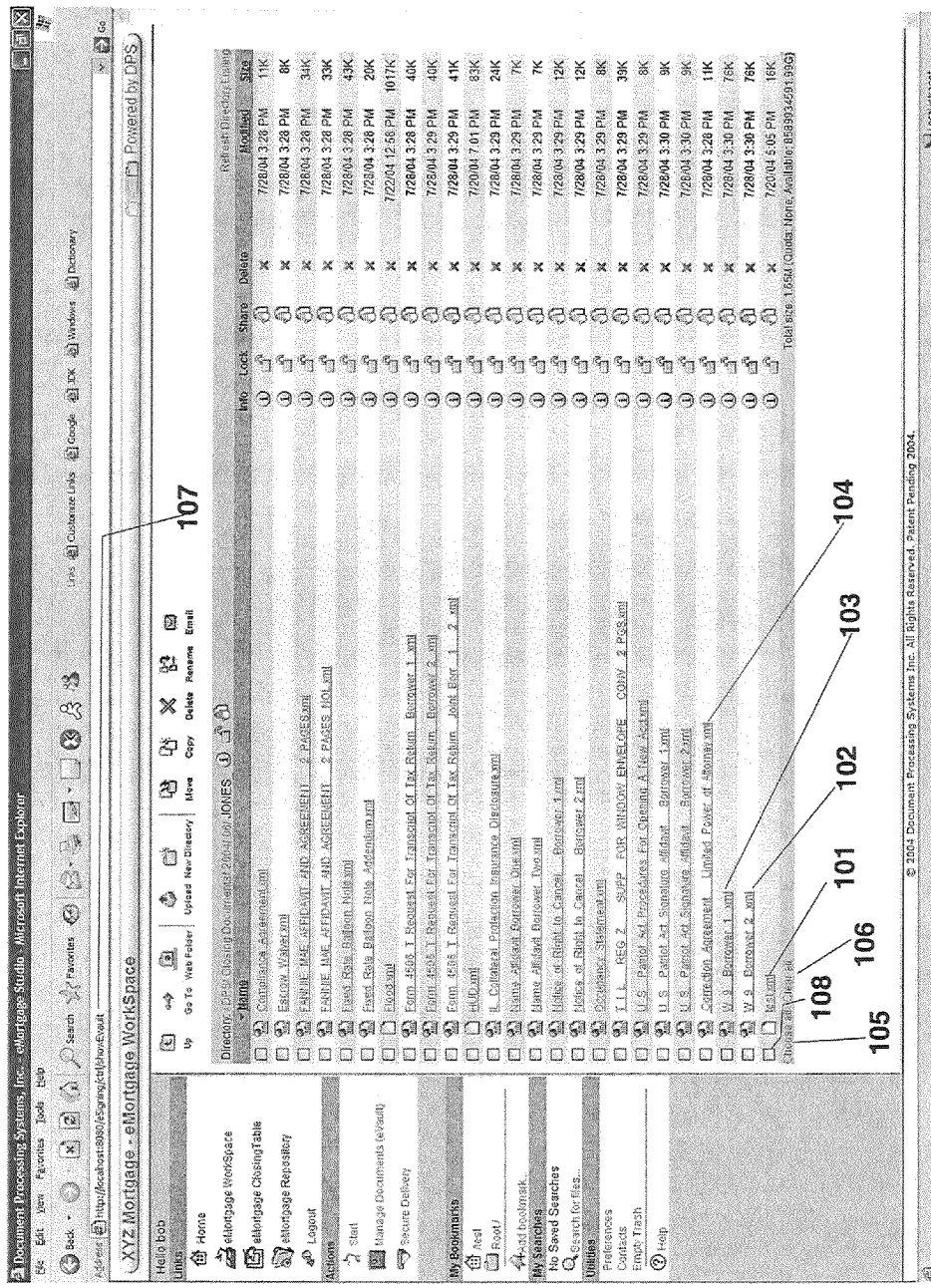
FIG. 7 illustrates a computer screen displaying an exemplary library of document sets viewed by the Document Repository Manager, according to an exemplary embodiment.

If one is to click directory "06" of FIG. 6 represented by reference numeral 51, a chosen directory therein is shown in FIG. 7. The Electronic document Repository Manager screen 100 is shown in FIG. 7. Reference numeral 101 shows an electronic document set "test.xml," reference numeral 102 shows the electronic document set "W 9 Borrower 2.XML," reference numeral 103 shows the electronic document set "W 9 Borrower 1.XML," reference numeral 104 shows the electronic document set "Correction Agreement Limited Power of Attorney.XML," reference numeral 105 shows "Choose All" and reference numeral 106 shows "Clear All." Reference numeral 107 shows the web site address. Reference numeral 108 is a box next to the line "test.xml," reference numeral 101. If one looks at the screen 100, one can see that each electronic document set has a box next to it. One of the features of the concepts and technologies disclosed herein that makes it user-friendly is how easy it is to use and understand how the software operates for a person using it. These boxes, which are used to choose one or more electronic document sets, show a good example of how the software is used. With a click of the mouse or other pointer device, an "X" or check-mark is placed in the box to indicate chosen electronic document sets. Once the end-user chooses the electronic document set(s) he then has to click to choose those electronic document sets.

Managing Packages

Figure 8:
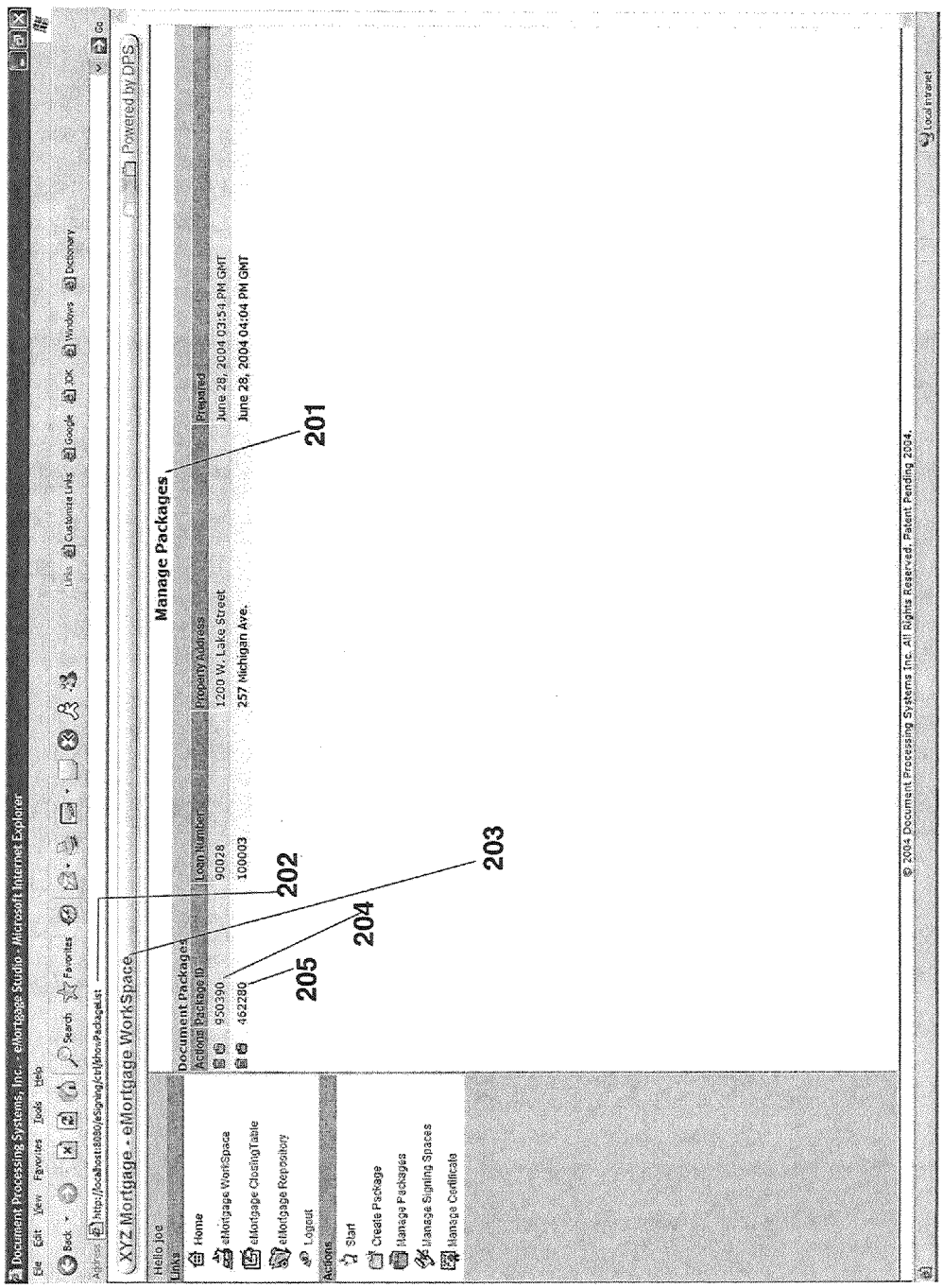
FIG. 8 illustrates an exemplary view of a computer screen of a Package Manager, according to an exemplary embodiment.

FIG. 8 shows a computer screen, 200 of the Package Manager. Reference numeral 201 shows that this screen is used to "Manage Packages." This is where packages are chosen for use, edited or otherwise managed. Reference numeral 202 shows the address of the packages being managed, reference numeral 203 shows "XYZ Mortgage-eMortgage Work-Space," reference numeral 204 shows package ID 950390 representing loan number 90028 at 1200 W. Lake Street that was prepared on Jun. 28, 2004 and the time is shown. Reference numeral 205 shows package ID 462280 representing loan number 100003 at 257 Michigan Ave. that was prepared on Jun. 28, 2004 and the time is shown.

The Signer Manager

FIG. 4A shows screen 300 of the Signer Manager. The Signer Manager is used to add signers for loans or other electronic document signing. Reference numeral 301 shows the box where data entry is done on signers to be added. The signing window has two tabs, 302 for electronic documents as chosen in FIGS. 4B and 303 for Signers as chosen in this electronic document as can be seen as the tab 303 is darker than the tab 302 in FIG. 4A. To add a signer, simply fill in the data in the box 301 and then click the add button, 305. To edit a signer select one from the list of signers 310-313 and click the "edit icon", 316. Each signer, 310 through 313 has its own "trash can icon," "edit icon" and "view certificate icon." For example, for signer Notary Nick, 310, there is an associated "trash can icon" 315, "edit icon" 316 and "view certificate icon", 317. To select an existing signer, click the select button, 304. The names of the signers are below name, 306. Also shown on the screen 300 are the package ID 307, the Loan Number 308 and the Property Address 309. Just as with most of the other parts of the package, with a minor amount of modification, the signer manager may be used with many electronic document signing applications besides loans and mortgages and are described for use in loans and mortgages as an example.

The Electronic Document Manager

The Electronic document Manager, 350 is shown in FIG. 4B. The signer box 359 lists all signer names with a box, 351 next to each name. This way, since not every signer will sign every electronic document, the preparer will configure in advance of signing who will sign each electronic document. This is done by clicking the electronic document to be configured, then clicking whichever boxes 351 signify the appropriate signers for that specific electronic document. However, many electronic documents are pre-set and are signed only by certain parties all the time as is the case of many electronic documents from the library of electronic documents. However, new electronic documents that are added are configurable as to who signs them. Even the pre-set electronic documents can be made configurable, if desired. The browse button may be clicked to find more electronic documents and then the add button, 352 is clicked to choose a given electronic document. Reference numeral 353 is a header for Electronic document Name and all the electronic document names of the electronic document set are listed below it. As more electronic documents are added the list grows accordingly. Also the order of electronic document signing at the closing table is configured in this screen 350. The list of electronic document names 353 are shown in sequential order. The order may be changed, however. Each electronic document name 353 has an up-arrow 354 and a down-arrow, 355. To move an electronic document higher in the order, click the up-arrow of the electronic document. To move an electronic document lower in the order, click the down-arrow of the electronic document. As an example for two electronic documents in screen 350, reference numeral 357 shows the electronic document titled "U.S. Patriot Act Signature Affidavit Borrower 1" and reference numeral 358 shows the electronic document entitled "U.S. Patriot Act Procedures for Opening a New Acct". After the preparer has finished configuring and choosing electronic documents, he clicks the done button, 356.

Although the Electronic document Manager screen, 350 shows an example of how to use the processes disclosed herein to configure what electronic documents are used and who the signers are of each electronic document, this process can have other methods of configuration, for example, drag and drop, highlighted boxes, tables, a split-screen system, a multi-screen system, just so long as the configuration is done in advance of the closing table.

The Signing Space Login

Figure 9:
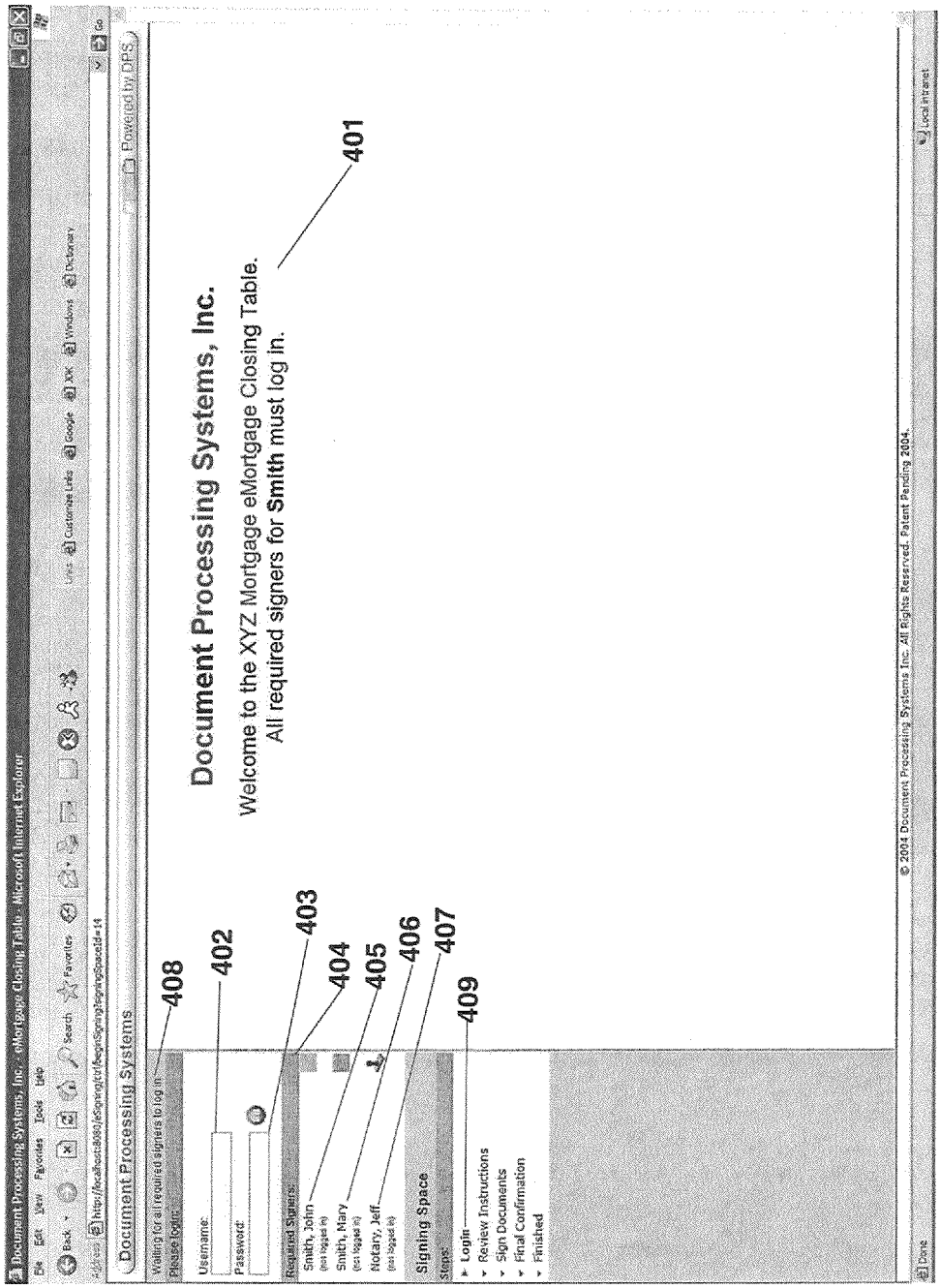
FIG. 9 illustrates an exemplary view of a computer screen of a Signing Space Login, according to an exemplary embodiment.

FIG. 9 shows the screen 400 that shows the Signing Space Login. This screen shows the company name and welcomes parties to the closing table in the message 401. At this point the username 402 and password 403 are entered, typically by the closing agent. The required signers block 404 is highlighted on the screen and the actual required signers are listed below as reference numbers 405, 406 and 407. As the required signers are listed, it is clear that the data are already configured. Note that the word Login, 409 has darker letters indicating that this is the current step.

Legal Notice and Confidentiality Page

The Legal Notice and Confidentiality Page, 500 is a legal notice that should be read by all users prior to going further in the software. The list of electronic documents for the closing table are listed at reference numeral 501, however, there is a slide bar in the software, as not all electronic documents are shown in the visible portion of the screen 501. The legal notice, 502 is posted. Reference numerals 503, 507 and 511 list the signers. Reference numerals 504, 508 and 512 show the word "Passphrase:" and below are the boxes 505, 509 and 513 where each signer at the closing table enters a Passphrase. The boxes 506, 510 and 514 are to be clicked by each signer. It is preferable to have a notary present to witness the signing. Each electronic document in the list 501 has a mark, 515 that indicates it is not done yet. After each electronic document is digitally signed, the mark 515 changes to a different mark. The "Review Instructions" bar 516 is in darker print as this is the current step. Also, note that the signers for this closing table, 517-519 are listed in the upper left.

Electronic Document Signing

FIG. 5A shows a screen, 600 an electronic document. Reference numeral 601 is a darkened bar saying "steps". The steps below, Login and Review Instructions have marks 602 and 603 to the left, indicating that these steps have been completed. The step Sign Electronic documents is in darkened or bold letters to indicate that this is the current step. Also, the mark 604 indicates that this is the current step. Markings 605 and 606 indicate that the last two steps have not yet been complete. Reference numeral 607 says "Signers" in a gray box and below it is a list of signers. Smith, John is in darker letters indicating that he is the current signer and also has a marking 608 also indicating that he is the current signer. Smith, Mary is marked lighter, thus indicating that Mary Smith is not the current signer and also the marking 609 next to Mary Smith also indicates that she is not the current signer. The word Electronic documents is in a gray box, 610 and below the box 610 is a list of electronic documents to be used at the closing table. The top item on the list, "Fixed Rate Balloon Note" is in darker letters and thus is indicated as the current electronic document. Furthermore, it is known that this is the current electronic document because marking 611 indicates that this is the current electronic document. Marking 612, is the kind of marking used for an electronic document that is not the current electronic document. Reference numeral 613 indicates Signing Space as current. Reference numeral 614 is a box that says "required Signers" and these required signers are listed below starting with signer 619. Reference numeral 615 lists the title of the electronic document, "balloon note". Reference numeral 616 is a statement that the signer has read the electronic records and will use it in place of a handwritten signature and will be bound by it when he clicks the box 617 below it. Reference numeral 618 is a number associated with the electronic document. This electronic document is ready for being digitally signed.

Figure 11:
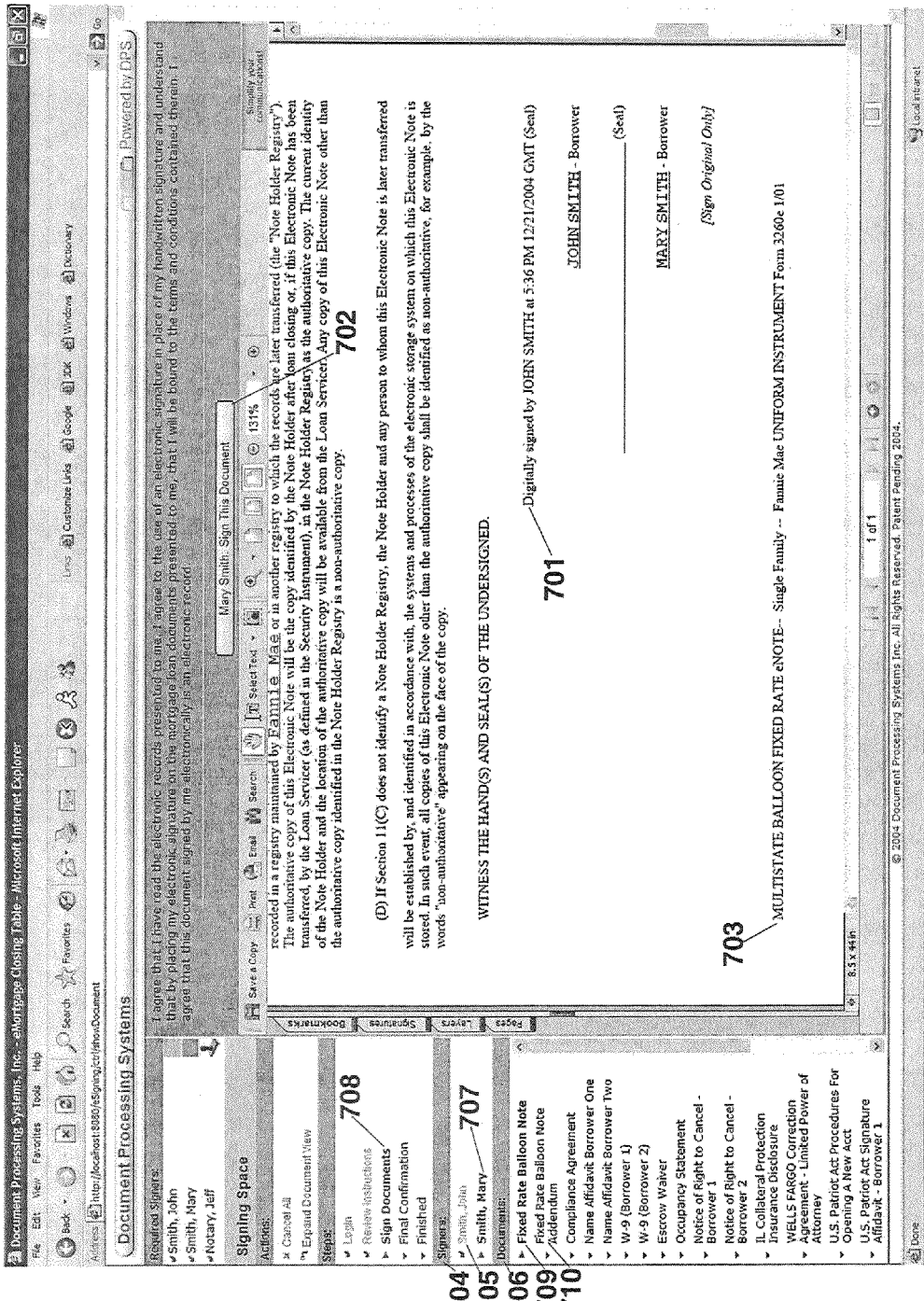
FIG. 11 illustrates an exemplary view of a computer screen of a Document Signing, according to an exemplary embodiment.

FIG. 11 shows a digitally signed electronic document, 700. Reference numeral 701 shows that this electronic document has been digitally signed by John Smith. Reference numeral 702 shows that this electronic document is waiting to be digitally signed by Mary Smith. Line 703 is part of the electronic document. Reference numeral 704 is above the names of the signers. Reference numeral 705 shows John Smith in light characters indicating that he is not the current signer while reference numeral 707 shows Mary Smith in darker characters indicating that she is the current signer. Reference numeral 708 shows "Sign Electronic documents" in darker characters indicating that this is the current step. Reference numeral 709 shows "Fixed Rate Balloon Note" in darker characters, indicating that this is the current electronic document. Reference numeral 710 shows the next electronic document that is not the current electronic document as it is displayed in lighter characters. The digital signatures are not done here in watermark, thus indicating that the electronic document is category 1 SMARTDOC.

Figure 12:
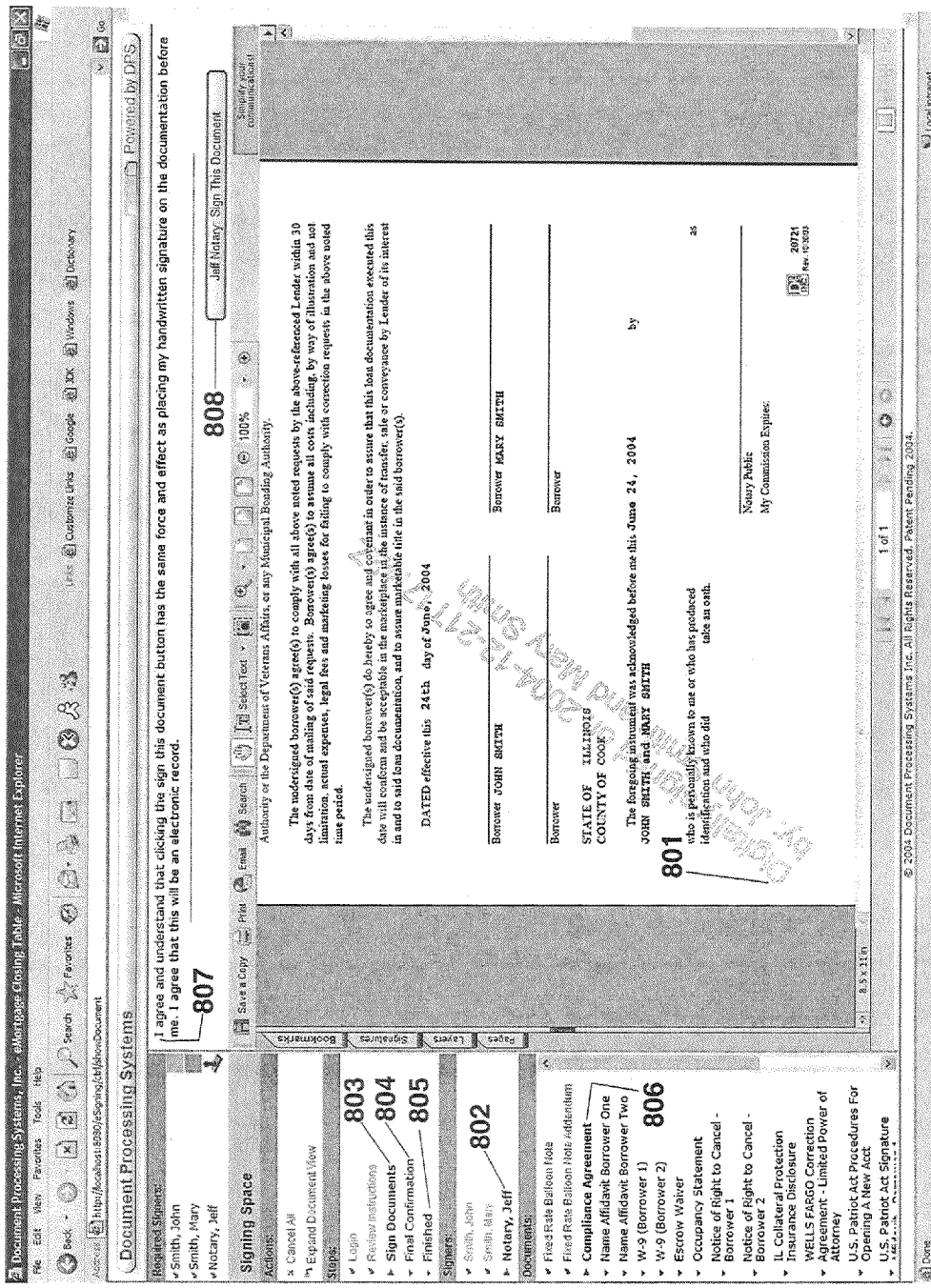
FIG. 12 illustrates an exemplary view of a computer screen of Document Signing, according to another exemplary embodiment.

FIG. 12 shows a digitally signed electronic document, 800. The watermark, 801 represents that a digital signature has been made, thus indicating that the electronic document is a type 3 or 4 SMART electronic document. Reference numeral 802 indicates that Notary, Jeff is the current signer and box 808 is to be clicked by him to be digitally signed by him. Reference numeral 803 indicates that "Sign Electronic documents" is the current step as it is in the darkest characters whereas 804 and 805 are in lighter characters and thus are not the current step. Reference numeral 806 indicates that "Compliance Agreement" is the current electronic document. Reference numeral 807 is the statement indicating that the signer agrees that by clicking the box 808 that he has digitally signed the electronic document.

Figure 13:
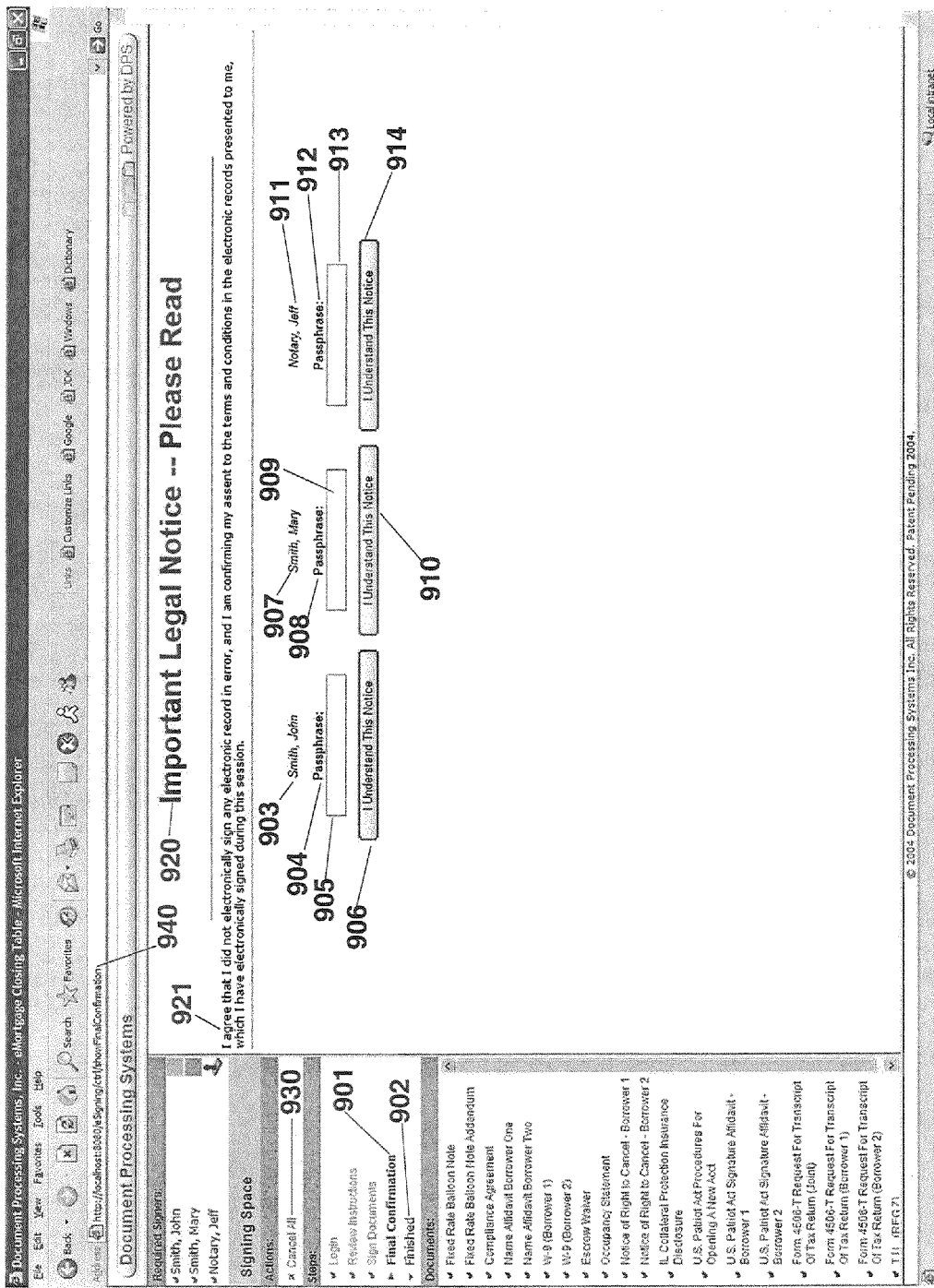
FIG. 13 illustrates aspects of a user approval screen, according to an exemplary embodiment.

FIG. 13 shows one of the final screens 900 of one embodiment of the concepts and technologies disclosed herein. This screen, 900 shows a legal notice 920 with legal text 921 for the final confirmation 901 that each signer willingly consents to the electronic disclosure and application of electronic signatures to electronic records. After this step, the process is finished 902. The address 940 is displayed on the screen 900. On this screen, 900, all signers 903, 907 and 911 are required to read the legal notice 920 and 921 to confirm that the process has been acceptable. If everything has been acceptable, then each signer separately, one at a time, enters his/her Passphrase 904, 908 and 912 in the boxes 905, 909 and 913, respectively. If the closing session is not acceptable to any signer for any reason, he/she may click the "cancel all", 930 to cancel the entire closing and all electronic documents that have been digitally signed. After this final confirmation step, 901 has been completed, the next step, "finished", 902 is next, after which the process closes, in this example.

How the Software Example Works

The Electronic Documents

SMART Electronic Documents

The concepts and technologies disclosed herein can leverage the MISMO (Mortgage Industry Maintenance Organization) SMART Electronic document specification. SMART is an acronym for Securable, Manageable, Archive-able, Retrievable, and Transferable. The specification, based on XML, is a general-purpose, flexible technology that can be used to implement any paper electronic document in electronic format. It binds together the data, page view, audit trail and signature(s) into a single electronic file. There are five distinct SMART Electronic document categories.

At a minimum, all SMART Electronic documents in the eMortgage Studio have header, signature and audit sections. Each category is distinguished by data and view sections. At the time of this patent application, the five distinct SMART Electronic documents are as follows;

Besides the minimum, category 1 SMART Electronic documents have both data and view sections. Data section elements are ARC'd to elements in the view section. An XML ARC is a link or reference from one electronic document element to another. The view section of the cat 1 is defined with XHTML.

Besides the minimum, category 2 SMART Electronic documents have only a view section. The view is defined with XHTML.

Besides the minimum, category 3 SMART Electronic documents have both data and view sections, although data are not ARC'd to the view. The view of a cat 3 is base64 encoded PDF, TIFF, JPEG, GIF or any other file format that can be used to represent an electronic document.

Besides the minimum, category 4 SMART Electronic documents have only a view section. The view of a cat 4 is defined the same as cat 3-base64 encoded such as PDF or TIFF. Other examples of formats are PSD, PDD, BMP, RLE, DIB, CRW, WEF, RAF, ORF, CIN, SDPX, DPX, FIDD, GIF, EPS, PS, FLM, JPG, JPEG, JPE, PSB, PDP, PCX, PCD, RAW, PCT, PICT, PXR, PNG, SCT, TGA, VDA, ICB, VST, WBMP and WBM. There may be other formats available that exist now or in the future that may be used with embodiments of the concepts and technologies disclosed herein.

Besides the minimum, category 5 SMART Electronic documents only have a data section and are typically used for transmitting loan information to loan servicing systems. Clearly cat 5 electronic documents would never be used where a view is necessary.

For the sake of presenting a consistent view regardless of SMART Electronic document category, all views are presented to signers in PDF format. Category 3 and 4 SMART Electronic documents, in the current embodiment, have base64 encoded PDF views that are base64 decoded on the fly and streamed to the Adobe Reader browser plug-in when the view is requested. Category 1 and 2 SMART Electronic documents have XHTML views that are converted to PDF on the fly using the Apache Software Foundation's FOP (Formatting Objects Processor) library.

Electronic Document Preparation System

Applicant's company had previously developed an electronic DOCUMENT PREPARATION SYSTEM (DOCPREP) which is a software package used for input of electronic document information with a regular library of electronic documents. DOCPREP includes several electronic document templates for electronic documents that are to be used frequently. These often-used electronic documents are generally fixed, although they can be modified in some circumstances. DOCPREP acts as a mail-merge for electronic documents involving data entry of fields such as names, addresses, loan information, and other variables specific to the parties and to the loan. Although DOCPREP is used by Applicant, there are similar data entry packages that may be used for data entry. DOCPREP is used as an example for purposes of describing the concepts and technologies disclosed herein in additional detail.

DOCPREP may be used for data entry of electronic documents. When electronic documents are generated this way, digital signatures may be conveyed within the electronic document in a normal print, in a convenient location for category 1 SMART Electronic documents as seen in 701 of FIG. 11. This is one way of entering data and printing electronic documents using the software disclosed herein. However, this convenience is not always possible with category 3 and 4 SMART Electronic documents, which use graphic or proprietary electronic document file formats as opposed to XHTML. Consequently, for such electronic documents, a watermark is used to indicate that a digital signature has been executed as seen in reference numeral 801 of FIG. 12. However, in a set of electronic documents for a closing, there can be a mixture of various category electronic documents in the set. The software disclosed herein can be is programmed specifically for each category. Just as DOCPREP is one tool used herein, watermarks also can be used in conjunction with the concepts and technologies disclosed herein.

Electronic Signatures

Electronic document signatures are industry standard W3C XML digital signatures that are typically computed over data and/or view sections, but can include other electronic document sections as well, including other signatures. According to the SMART Electronic document specification, category 1 and 2 signatures are explicitly conveyed in the SIGNATURE SECTION subsection of the XHTML view. The views of category 3 and 4 electronic documents cannot be altered, however, as doing so would invalidate any previously computed digital signatures. The signatures of category 3 and 4 electronic documents are conveyed with a watermark that is applied on the fly when the electronic document view is requested. See FIG. 12. Watermarks are applied to cat 3 and 4 docs using the iText PDF library. Watermark text that identifies signers is based on the subject DN of signer certificates.

Emortgage Studio™ Software

Applicant has developed a software package called Emortgage Studio™ SOFTWARE which can be used as an example of use of the concepts and technologies disclosed herein. HYPERTEXT is a markup language. HTML is a standard web language. HTML is a subset of SGML, the standard general markup language. Markup is a special code that describes how text should be represented or processed.

XML (eXtensible Markup Language) is a subset of SGML. XML is more practical and robust than HTML and Applicant believes that a type of XML known as XHTML will eventually replace HTML.

How Emortgage Studio™ Software Works

Emortgage Studio™ SOFTWARE is written mostly in JAVA, which is not only a computer language, but an architecture/environment. Emortgage Studio™ SOFTWARE uses SMARTDOCS which, in this example, are generated by ELECTRONIC DOCUMENT PREPARATION SYSTEM or DOCPREP developed by the company of the Applicant. ELECTRONIC DOCUMENT PREPARATION SYSTEM is used for data entry of information used in SMARTDOCS. Category 1 SMARTDOCS may use a template from FANNIE MAE in some cases. DOCPREP has an electronic document generator to generate PDF files, files that were originally associated with ADOBE ACROBAT and now are commonly generated with other software. The DOCPREP PDF files are converted to SMARTDOCS by base64 encoding the PDF file and storing the result in the view section of category 3 and 4

SMARTDOCS. The most robust way of preparing digital electronic documents for the Emortgage Studio™ SOFTWARE is to use DOCPREP for electronic document preparation because it includes a data entry interface for maintaining buyer and seller information.

Actually, there are two types of PDF files, those that can be read as text and those that can only be read normally as graphic images. Obviously, those that can be read as text are easier to work with. DOCPREP generates PDF files. JAVA is used to manipulate files to become SMARTDOCS. Base64 code is known to one skilled in the art and is used to represent binary data using common, printable characters including punctuation and keyboard characters. In JAVA, to present a base64 encoded PDF view on a screen, one would "base64 de-code" it, or translate it from base64 code to binary code. Base64 encoding/decoding is used for Category 3 and 4 SMARTDOCS. In JAVA, to show these on a screen, the program would contain <view> base 64 encoded character strings </view>. Thus, the above would be used to show a PDF file, a TIFF file or other graphic file on the screen. Category 5 SMARTDOCS have no view and is used for transmitting data.

W3C XML Digital Signatures

W3C is the Worldwide Web Consortium where W3 is short for the term www. W3C is an international group that maintains Internet standards, which are published currently at http://w3c.org/. One standard that W3C defined is the standard requirements representing a digital signature using XML.

DOCPREP used in Emortgage Studio™ Software

With DOCPREP, electronic documents may be prepared with an automatic electronic document system such as DPS DIRECT-DOCS® made by Applicant's company. Alternately, the preparer may upload electronic documents. Currently PDF is supported, however, it is not limited to PDF electronic documents. Other formats that may be used include TIFF, PSD, PDD, BMP, RLE, DIB, CRW, WEF, RAF, ORF, CIN, SDPX, DPX, FIDD, GIF, EPS, PS, FLM, JPG, JPEG, JPE, PSB, PDP, PCX, PCD, RAW, PCT, PICT, PXR, PNG, SCT, TGA, VDA, ICB, VST, WBMP and WBM. Future formats that do not exist at the time of this writing may also be used.

Digital Certificates

Digital certificates are used in PKI or Public Key Infrastructure and are based on asymmetric key pairs. One key is private and the other key is public. The key pairs are mathematically related such that one key encrypts data that only the other key can decrypt. So, when you digitally sign, you verify that 1) someone has the public key and 2) if you can decipher, then by definition, the private key is correct and the person has legitimate access.

To digitally sign a block of data, one must compute a "hash" of the data and then encrypt the hash with the private key of a digital certificate. A hash is a compressed numerical representation of data. Verifying a signature requires decrypting the encrypted hash with the digital certificate's public key, computing the hash of the data and comparing the 2 hash values.

Part of the W3C specification for XML digital signatures (at the time of this writing) requires storage of both the digital signature, computed using the private key of a digital certificate, and also the digital certificate containing the public key corresponding to the private key of the certificate. In this fashion one can verify the stored signature without concern for finding the public key—it is self contained. The Emortgage Studio™ SOFTWARE automatically verifies digital signatures.

Other Variations of the Present Disclosure and Unlimited Possibilities

Of course, there are other screens that could have been made that do the same thing as the screens shown in this process. Each screen could have been slightly different, for example, the list of electronic documents and steps that has been shown on the left could have been instead placed on the right, or in the middle, or in a different window on a second computer screen. Then the electronic documents can be shown in larger view on one computer screen while the indicators can be shown on another screen. A big screen could be used, for example that of a very large monitor or a big screen TV so that the electronic document signing can be viewed clearly by all parties. The big screen could have multiple windows or multiple big screens could be used. There is no limit on how this process can be implemented. Although the screens have been developed in a user-friendly and organized fashion, with the look and feel shown in FIGS. 4-13, the processes disclosed herein can be implemented with screens that are less user-friendly and less organized without taking away from the spirit and scope of the present disclosure. There are infinite possibilities on how the processes disclosed herein can be practiced. One of the key features is the automation. Another is the advance configuration of the electronic document signing table that allows the automation to be done and thus errors are minimized and precious time of all parties is saved, which also results in cost savings. Although digital signatures have been done before, it is the package, the pre-configuration, the automation, the process and the hiding of the complexities and impracticalities of PKI based digital signatures that make it a pioneer patent. The screens help the user(s) navigate through the process with little difficulty and this is an enhancement, especially with regard to the simple, easy to use digital certificates. According to some embodiments, the concepts and technologies disclosed herein can be used to save hours of time over the years, resulting in savings in costs for electronic document signing for closing of loans, contracts that involve multiple electronic documents, peace treaties, international agreements, real estate transactions, legislation and any multiple electronic document transaction whatsoever.

Future Evolution

In the future, there will be new kinds of pointing devices that do not exist at the time of this patent application that may be incorporated into embodiments of the concepts and technologies disclosed herein. According to some contemplated embodiments, a wink of the eye can be given the effect as clicking a mouse, for example, in some devices made for the disabled. Similarly, some, all, or none of the technology existing for the disabled now and in the future may be used with embodiments of the concepts and technologies disclosed herein. For example, in the future, new kinds of screen devices, monitors, TVs may be available, and larger screens will be available at a lower price than at the time of this writing, thus making it more practical to project a larger image for multiple signers. Image projectors may be used to project images on a wall or other surface. At the time of this writing, WINDOWS XP is a popular operating system for a microcomputer. However, in time, new operating systems will replace WINDOWS XP, with more features and power so that the processes disclosed herein can be made to work better and faster. Faster computer CPUs, chipsets and memory chips have been developed for better speed of both computers and of computer graphic adapters. Newer CPUs will have more instructions that will be taken advantage of by future operating systems and languages. Although, Java is a popular language used on the internet today, new hybrids of Java will develop and even completely new languages may be developed that can be used. Computer language is not a limitation herein, as any computer language may be used, present, past and future languages when practical. Although it is not known what new developments of hardware and software will be available in the future, these all may be incorporated with various embodiments of the concepts and technologies disclosed herein. Thus, as technology advances, the concepts and technologies disclosed herein can improve as well and therefore may not become obsolete. All these new devices and things are to be incorporated in the present disclosure so that the concepts and technologies disclosed herein can be used with some of the hardware, software and operating systems of the future and the concepts and technologies disclosed herein are not limited by the choices of computer hardware, software and operating systems available at the time of this writing. It should be understood that the various components of the various embodiments disclosed herein can be combined in any manner without departing from the scope of the present disclosure and the claims appended hereto. The future applicability of the concepts and technologies disclosed herein has no limits or bounds except for the limits imposed in the legal standards of electronic signatures which may also change in the future. This concepts and technologies disclosed herein are able to function within any such legal standards of the future both nationally and internationally.

The present disclosure has been described in an illustrative manner, and it is to be understood that the terminology used is intended to be in the nature of words of description rather than of limitation. Obviously, many modifications and variations of the present disclosure are possible in light of the above teachings. It is, therefore, to be understood that within the scope of the appended claims, the concepts and technologies disclosed herein may be practiced otherwise than as specifically described.

Based on the foregoing, it should be appreciated that systems and methods for providing paperless mortgage closings and other transactions have been disclosed herein. Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A computer-implemented method for providing an electronic mortgage closing, the computer-implemented method comprising performing computer-implemented operations for:
   receiving, at a document processing system having a processor, electronic mortgage closing documents associated with an electronic mortgage closing;
   identifying, at the document processing system, entities participating in the electronic mortgage closing;
   connecting the entities to a document signing session;
   providing the electronic mortgage closing documents to the entities in a predetermined order during the document signing session, wherein the electronic mortgage closing documents are provided to the entities for execution of an action representing signing of the electronic mortgage closing documents;
   detecting, for each of the entities, execution of the action representing signing of the electronic mortgage closing documents;
   finalizing the electronic mortgage closing documents based, at least in part, upon the signing; and
   recording a location associated with at least one of the entities, a time associated with the document signing session, and a date associated with the document signing session.

2. The method of claim 1, further comprising generating, at an electronic document creation system, the electronic mortgage closing documents, wherein the electronic mortgage closing documents are generated based, at least partially, upon capturing data corresponding to physical mortgage closing documents using an image capture device.

3. The method of claim 2, wherein the electronic document creation system comprises:
   a first server for storing the electronic mortgage closing documents;
   a second server for storing information relating to content of the electronic mortgage closing documents; and
   a software program for populating the electronic mortgage closing documents with information relevant to the document signing session.

4. The method of claim 2, wherein the electronic document creation system comprises:
   an input device for inputting the physical mortgage closing documents; and
   software for converting the physical mortgage closing documents into the electronic mortgage closing documents.

5. The method of claim 4, wherein the image capturing device comprises a scanner.

6. The method of claim 2, wherein the electronic document creation system is configured to execute software for importing existing electronic mortgage closing documents.

7. The method of claim 2, wherein the electronic document creation system is configured to execute software for creating new electronic mortgage closing documents.

8. The method of claim 1, further comprising inserting a digital signature in at least one of the electronic mortgage closing documents to provide a digital signature authentication capability for the at least one of the electronic mortgage closing documents.

9. The method of claim 1, further comprising generating digital certificates configured to allow input of personal information, to digitally encrypt the personal information, and to enable use of a digitally secure certificate.

10. The method of claim 1, further comprising coordinating the signing and authentication of the electronic mortgage closing documents to complete the document signing session.

11. The method of claim 10, wherein at least one of the entities connects to the document signing session using a wireless network, and wherein at least one of the entities is authenticated by identifying a wireless generated signal associated with the at least one of the entities.

12. The method of claim 10, further comprising modifying one or more of:
content of the electronic mortgage closing documents;
the predetermined order in which the electronic mortgage closing documents are presented and processed;
an operation of the document processing system;
requirements associated with the document signing session; and variables associated with operations of the document processing system.

13. The method of claim 10, further comprising restricting access to the document processing system and allowing entities associated with the document signing session to access the document processing system.

14. The method of claim 1, further comprising:
determining if the signing and authenticating process has been completed by the entities; and
certify the electronic mortgage closing documents in response to determining that the signing and authentication process has been completed by the entities.

15. The method of claim 1, further comprising storing the electronic mortgage closing documents, a plurality of electronic signatures corresponding to the entities, and data indicating that the electronic mortgage closing documents have been finalized and authenticated.

16. The method of claim 1, further comprising recording data indicating identities of the entities, and a duration of the document signing session.

17. The method of claim 16, further comprising storing signing and authenticating information with the electronic mortgage closing documents.

18. The method of claim 1, further comprising:
recording data indicating
an identity of an owner of at least one of the electronic mortgage closing documents, and
a location associated with the owner of the at least one of the electronic mortgage closing documents; and
triggering transferring of ownership of at least one of the electronic mortgage closing documents from the owner to a new owner.

19. A computer-implemented method for providing an electronic mortgage closing, the computer-implemented method comprising performing computer-implemented operations for:
receiving electronic mortgage closing documents at a server computer;
determining entities to participate in a document signing session;
connecting each of the entities to the document signing session, the document signing session comprising a session during which the electronic mortgage closing documents are to be signed and authenticated by the entities;
presenting the electronic mortgage closing documents to the entities during the document signing session, the electronic mortgage closing documents being presented to the entities in a predetermined order and the electronic mortgage closing documents being processed in the predetermined order;
coordinating the signing and authenticating of the electronic mortgage closing documents by the entities in the predetermined order;
ending the document signing session;
packaging, finalizing, and authenticating the electronic mortgage closing documents that have been electronically signed; and
recording electronic document information indicating:
identities of the entities,
a location associated with the electronic mortgage closing documents,
a time associated with the document signing session,
a date associated with the document signing session, and
a duration of the document signing session.

20. An electronic mortgage closing document processing system comprising:
a server computer configured to:
receive electronic mortgage closing documents;
associate a digital signature capability with the electronic mortgage closing documents to provide a digital signature authentication capability for the electronic mortgage closing documents;
identify entities participating in an electronic document signing session;
determine that the entities have connected to the electronic document signing session;
provide the electronic mortgage closing documents to the entities, the electronic mortgage closing documents being provided to the entities for execution of an action representing signing of the electronic mortgage closing documents, wherein the electronic mortgage closing documents are provided to the entities in a predetermined order;
receive a plurality of electronic signatures corresponding to the entities, at least one of the plurality of electronic signatures corresponding to the entities being received via a wireless computing device;
store the electronic mortgage closing documents and the plurality of electronic signatures corresponding to the entities;
store information relating to content of the electronic mortgage closing documents; and
populate the electronic mortgage closing documents with information relevant to the electronic document signing session.

\* \* \* \* \*

UNITED STATES PATENT AND TRADEMARK OFFICE
CERTIFICATE OF CORRECTION

PATENT NO. : 8,442,920 B1
APPLICATION NO. : 13/419539
DATED : May 14, 2013
INVENTOR(S) : Paul Rakowicz et al.

It is certified that error appears in the above-identified patent and that said Letters Patent is hereby corrected as shown below:

On the title page, item 63 (Related U.S. Application Data):

Please replace "Continuation of application No. 12/911,471, filed on Oct. 25, 2010, now Pat. No. 8,140,440"

with

--Continuation of application No. 12/911,471, filed on Oct. 25, 2010, now Pat. No. 8,140,440, which is a continuation of application No. 11/037,505, filed January 18, 2005, now U.S. Pat. No. 7,822,690, which is a non-provisional of and claims priority to U.S. Prov. Pat. App. No. 60/543,148, filed February 10, 2004--.

Signed and Sealed this
Twenty-seventh Day of May, 2014

Michelle K. Lee
*Deputy Director of the United States Patent and Trademark Office*